United States Patent
Hoppe et al.

(10) Patent No.: US 9,905,035 B2
(45) Date of Patent: *Feb. 27, 2018

(54) AUTOMATED VIDEO LOOPING WITH PROGRESSIVE DYNAMISM

(71) Applicant: Microsoft Technology Licensing, LLC, Redmond, WA (US)

(72) Inventors: Hugues Hoppe, Redmond, WA (US); Neel Suresh Joshi, Seattle, WA (US); Zicheng Liao, Urbana, IL (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/372,718

(22) Filed: Dec. 8, 2016

(65) Prior Publication Data

US 2017/0154458 A1    Jun. 1, 2017

Related U.S. Application Data

(63) Continuation of application No. 15/168,154, filed on May 30, 2016, now Pat. No. 9,547,927, which is a continuation of application No. 15/043,646, filed on Feb. 15, 2016, now Pat. No. 9,378,578, which is a continuation of application No. 13/886,313, filed on May 3, 2013, now Pat. No. 9,292,956.

(51) Int. Cl.
*G06T 13/00* (2011.01)
*G06T 13/80* (2011.01)
*G06F 3/048* (2013.01)

(52) U.S. Cl.
CPC ............. *G06T 13/80* (2013.01); *G06F 3/048* (2013.01)

(58) Field of Classification Search
None
See application file for complete search history.

(56) References Cited

U.S. PATENT DOCUMENTS 5,877,445 A    3/1999 Hufford et al.
6,600,491 B1   7/2003 Szeliski et al.
(Continued)

FOREIGN PATENT DOCUMENTS

CN    101479767 A    7/2009
WO    2008099406 A2   8/2008

OTHER PUBLICATIONS

"Notice of Allowance Issued in European Patent Application No. 14729785.7", dated Apr. 22, 2016, 7 Pages.
(Continued)

*Primary Examiner* — Peter Hoang
(74) *Attorney, Agent, or Firm* — Medley, Behrens & Lewis, LLC

(57) ABSTRACT

Various technologies described herein pertain to generating a video loop. An input video can be received, where the input video includes values at pixels over a time range. An optimization can be performed to determine a respective input time interval within the time range of the input video for each pixel from the pixels in the input video. The respective input time interval for a particular pixel can include a per-pixel loop period and a per-pixel start time of a loop at the particular pixel within the time range from the input video. Moreover, an output video can be created based upon the values at the pixels over the respective input time intervals for the pixels in the input video.

20 Claims, 14 Drawing Sheets

(56) References Cited

U.S. PATENT DOCUMENTS

| | | |
|---|---|---|
| 6,636,220 B1 | 10/2003 | Szeliski et al. |
| 7,912,337 B2 | 3/2011 | Souchard |
| 8,301,669 B2 | 10/2012 | O'Brien-Strain et al. |
| 9,292,956 B2 | 3/2016 | Hoppe et al. |
| 9,378,578 B1 | 6/2016 | Hoppe et al. |
| 9,547,927 B2 | 1/2017 | Hoppe et al. |
| 2005/0086027 A1 | 4/2005 | Li |
| 2008/0001950 A1 | 1/2008 | Lin et al. |
| 2013/0229581 A1 | 9/2013 | Joshi et al. |

OTHER PUBLICATIONS

"Search Report Issued in European Patent Application No. EP16184116.8", dated Oct. 19, 2016, 10 Pages.

"Response to the Non-Final Office Action for U.S. Appl. No. 15/168,154", filed Jul. 29, 2016, 3 pages.

"Notice of Allowance and Fees Due for U.S. Appl. No. 15/168,154", dated Sep. 9, 2016, 8 pages.

Yeh, et al., "A Tool for Automatic Cinemagraphs", Retrieved at <<http://www.csie.ntnu.edu.tw/~myeh/papers/mm12-demo.pdf>>, in Proceedings of the 20th ACM International Conference on Multimedia, Oct. 29, 2012, pp. 1-2.

Bollom, et al., "Creating User-Driven Cinemagraphs", Retrieved at <<http://www.matthewbollom.com/cinemagraphs/approach/>>, Retrieved Date: Feb. 9, 2013, pp. 1-12.

"Cliplets: Tutorials", Retrieved at <<http://research.microsoft.com/en-us/um/redmond/projects/cliplets/tutorials.aspx>>, Retrieved Date: Feb. 9, 2013, pp. 1-3.

"7 Apps to Create Cinemagraphs on Your Smartphone", Retrieved at <<http://www.hongkiat.com/blog/cinemagraph-iphone-android-apps/>>, Retrieved Date: Feb. 9, 2013, pp. 1-9.

Jenkins, Steve, "Create Cinemagraph Animated Gifs from Video", Retrieved at <<http://www.webdesignermag.co.uk/tutorials/create-cinemagraph-animated-gifs-from-video/>>, Dec. 26, 2011, pp. 1-15.

Agarwala, et al., "Interactive Digital Photomontage", Retrieved at <<http://grail.cs.washington.edu/projects/photomontage/photomontage.pdf>>, in Journal of ACM Transactions on Graphics, vol. 23, Issue 3, Aug. 2004, pp. 1-9.

Agarwala, et al., "Panoramic Video Textures", Retrieved at <<http://scholarworks.umass.edu/cgi/viewcontent.cgi?article=1039&context=cs_faculty_pubs>>, in Journal of ACM Transactions on Graphics, vol. 24, Issue 3, Jul. 2005, pp. 1-7.

Bai, et al., "Selectively De-Animating Video", Retrieved at <<http://graphics.berkeley.edu/papers/Bai-SDV-2012-08/Bai-SDV-2012-08.pdf>>, in Journal of ACM Transactions on Graphics, vol. 31, Issue 4, Jul. 2012, pp. 1-10.

Beck, et al., "Cinemagraphs", Retrieved at <<http://cinemagraphs.com/>>, Retrieved Date: Feb. 11, 2013, p. 1.

Bennett, et al., "Computational Time-Lapse Video", Retrieved at <<http://www.csbio.unc.edu/mcmillan/pubs/sig07_Bennett.pdf>>, in Journal of ACM Transactions on Graphics, vol. 26, Issue 3, Jul. 2007, pp. 1-6.

Boykov, et al., "Fast Approximate Energy Minimization via Graph Cuts", Retrieved at <<http://www.cs.cornell.edu/rdz/papers/bvz-iccv99.pdf>>, in Journal of IEEE Transactions on Pattern Analysis and Machine Intelligence, vol. 23, Issue 11, Nov. 2001, pp. 1-8.

Burt, et al., "A Multiresolution Spline with Application to Image Mosaics", Retrieved at <<http://www.cs.princeton.edu/courses/archive/fall05/cos429/papers/burt_adelson.pdf>>, in Journal of ACM Transactions on Graphics, vol. 2, No. 4, Oct. 1983, pp. 1-20.

Cho, et al., "A Content-Aware Image Prior", Retrieved at <<http://ieeexplore.ieee.org/stamp/stamp.jsp?tp=&arnumber=5540214>>, in Proceeding of IEEE Conference on Computer Vision and Pattern Recognition, Jun. 13, 2010, pp. 1-8.

Chuang, et al., "Animating Pictures with Stochastic Motion Textures", Retrieved at <<http://www.opusonemusic.net/visualmusic/papers/p853-chuang.pdf>>, in Journal of ACM Transactions on Graphics, vol. 24, Issue 3, Jul. 2005, pp. 1-8.

Cohen, et al., "The Moment Camera", Retrieved at <<http://research.microsoft.com/pubs/75560/Cohen-Szeliski_C06.pdf>>, in Journal of IEEE Computer Society, vol. 39, No. 8, Aug. 2006, pp. 1-6.

Couture, et al., "Panoramic Stereo Video Textures", Retrieved at <<http://ieeexplore.ieee.org/stamp/stamp.jsp?tp=&arnumber=6126376>>, in Proceeding of IEEE International Conference on Computer Vision, Nov. 6, 2011, pp. 1-8.

Freeman, et al., "Motion Without Movement", Retrieved at <<http://citeseerx.ist.psu.edu/viewdoc/download?doi=10.1.1.87.8942&rep=rep1&type=pdf>>, in Proceeding of the 18th Annual Conference on Computer Graphics and Interactive Techniques, Jul. 1991, pp. 1-4.

Horn, et al., "Determining Optical Flow", Retrieved at <<http://people.csail.mit.edu/bkph/papers/Optical_Flow_OPT.pdf>>, in Artificial Intelligence, vol. 17, Issue 1-3, Aug. 1981, pp. 1-19.

Joshi, et al., "Cliplets: Juxtaposing Still and Dynamic Imagery", Retrieved at <<http://research.microsoft.com/en-us/um/people/hoppe/cliplets.pdf>>, in Proceedings of the 25th Annual ACM Symposium on User Interface Software and Technology, Oct. 7, 2012, pp. 1-10.

Kolmogorov, et al., "What Energy Functions can be Minimized Via Graph Cuts?", Retrieved at <<http://ieeexplore.ieee.org/stamp/stamp.jsp?tp=&arnumber=1262177>>, in IEEE Transactions on Pattern Analysis Machine Intelligence, vol. 26, Issue 2, Feb. 2004, pp. 1-13.

Kwatra, et al., "Graphcut Textures: Image and Video Synthesis using Graph Cuts", Retrieved at <<http://www.cc.gatech.edu/~turk/my_papers/graph_cuts.pdf>>, in Journal of ACM Transactions on Graphics, vol. 22, Issue 3, Jul. 2003, pp. 1-10.

Liu, et al., "Motion Magnification", Retrieved at <<http://persci.mit.edu/pub_pdfs/Liu_ACM_24-3.pdf>>, in Journal of ACM Transactions on Graphics, vol. 24, Issue 3, Jul. 2005, pp. 1-8.

Mahajan, et al., "Moving Gradients: A Path-Based Method for Plausible Image Interpolation", Retrieved at <<http://people.csail.mit.edu/wojciech/MovingGradients/MovingGradients.pdf>>, in Journal of ACM Transactions on Graphics, vol. 28, Issue 3, Aug. 2009, pp. 1-11.

Marks, et al., "Design Galleries: A General Approach to Setting Parameters for Computer Graphics and Animation", Retrieved at <<http://vis.cs.brown.edu/results/videos/bib/pending/design-gallerys-tech-report.pdf>>, in Proceedings of the 24th Annual Conference on Computer Graphics and Interactive Techniques, Oct. 1997, pp. 1-24.

Pritch, et al., "Nonchronological Video Synopsis and Indexing", Retrieved at <<http://ieeexplore.ieee.org/stamp/stamp.jsp?tp=&arnumber=4444355>>, in Journal of IEEE Transactions on Pattern Analysis Machine Intelligence, vol. 30, Issue 11, Nov. 2008, pp. 1-14.

Rav-Acha, et al., "Dynamosaicing: Mosaicing of Dynamic Scenes", Retrieved at <<http://ieeexplore.ieee.org/stamp/stamp.jsp?tp=&arnumber=4293208>>, in Journal of IEEE Transactions on Pattern Analysis Machine Intelligence, vol. 29, Issue 10, Oct. 2007, pp. 1-13.

Schodl, et al., "Video Textures", Retrieved at <<http://fangorn.colby.edu/cs/maxwell/courses/cs397-vision/F07/papers/schodl-videoTextures-sig00.pdf>>, in Proceedings of the 27th Annual Conference on Computer Graphics and Interactive Techniques, Jul. 2000, pp. 1-10.

Sunkavalli, et al., "Factored Time-Lapse Video", Retrieved at <<http://www.merl.com/reports/docs/TR2007-117.pdf>>, in Journal of ACM Transactions on Graphics, vol. 26, Issue 3, Jul. 2007, pp. 1-12.

Tompkin, et al., "Towards Moment Images: Automatic Cinemagraphs", Retrieved at <<http://ieeexplore.ieee.org/stamp/stamp.jsp?tp=&arnumber=6103279>>, in Proceeding of the 8th European Conference on Visual Media Production, Nov. 16, 2011, pp. 1-7.

Wang, et al., "Interactive Video Cutout", Retrieved at <<http://www.wisdom.weizmann.ac.il/mathusers/vision/courses/2006_2/papers/vid_seg/Wang%20video%20cutouts.pdf>>, in Journal of ACM Transactions on Graphics, vol. 24, Issue 3, Jul. 2005, pp. 1-10.

(56) References Cited

OTHER PUBLICATIONS

Wu, et al., "Eulerian Video Magnification for Revealing Subtle Changes in the World", Retrieved at http://people.csail.mit.edu/mrub/papers/vidmag.pdf>>, ACM Transactions on Graphics, vol. 31, Issue 4, 2012, pp. 1-8.

"Written Opinion of the International Preliminary Examining Authority for PCT Patent Application No. PCT/US2014/036473", dated Apr. 7, 2015, 6 pages.

"Response to International Search Report (ISR) and Written Opinion for PCT Patent Application No. PCT/US2014/036473", Filed Date: Oct. 17, 2014, 7 pages.

"Response to International Search Report (ISR) and Written Opinion for PCT Patent Application No. PCT/US2014/036473", Filed Date: Apr. 23, 2015, 8 pages.

"International Search Report & Written Opinion for PCT Application No. PCT/US2014/036473", Mailed Date: Aug. 29, 2014, 9 Pages.

Wang, et al., "Videoshop: a new framework for spatio-temporal video editing in gradient domain", in Proceedings of IEEE Computer Society Conference on Computer Vision and Pattern Recognition, vol. 2, Jun. 20, 2005, 1 page.

Wang, et al., "Seamless Video Editing" in Proceedings of the 17th International Conference on Pattern Recognition, Aug. 2004, 6 pages.

Yeh, et al., "An Approach to Automatic Creation of Cinemagraphs", in Proceedings of the 20th ACM international conference on Multimedia, Oct. 29, 2012, pp. 1153-1156.

Wang, Brian., "Poisson Blending", Published on: Nov. 2, 2012, Available at: <<http://web.engr.illinois.edu/~bwang8/cs498dwh/proj3/>>, 4 pages.

Guo, et al., "Mesh-Guided Optimized Retexturing for Image and Video", in Proceedings of IEEE Transactions on Visualization and Computer Graphics, vol. 14, Issue 2, Mar. 2008, pp. 426-439.

Agarwala, Aseem, "Efficient Gradient-Domain Compositing Using Quadtrees", in journal of ACM Transactions on Graphics, vol. 26, Issue 3, Jul. 2007, 6 pages.

Ashikhmin, Michael, "Synthesizing Natural Textures", in Proceedings of the Symposium on Interactive 3D Graphics, Mar. 1, 2001, pp. 217-226.

Bhat, et al., "Fourier Analysis of the 2D Screened Poisson Equation for Gradient Domain Problems", in Proceedings of the 10th European Conference on Computer Vision: Part II, Oct. 12, 2008, pp. 1-14.

Liu, et al., "Parallel Graph-Cuts by Adaptive Bottom-Up Merging", in Proceedings of IEEE Conference on Computer Vision and Pattern Recognition, Jun. 13, 2010, 8 pages.

Perez, et al., "Poisson Image Editing", in Journal ACM Transactions on Graphics, vol. 22, Issue 3, Jul. 2003, pp. 313-318.

"Non-Final Office Action for U.S. Appl. No. 13/886,313", dated Jan. 22, 2015, 17 pages.

"Response to the Non-Final Office Action for U.S. Appl. No. 13/886,313", filed Jul. 22, 2015, 14 pages.

"Notice of Allowance and Fees Due for U.S. Appl. No. 13/886,313", dated Nov. 9, 2015, 8 pages.

"Notice of Allowance and Fees Due for U.S. Appl. No. 15/043,646", dated Apr. 13, 2016, 9 pages.

"Non-Final Office Action for U.S. Appl. No. 15/168,154", dated Jul. 28, 2016, 7 pages.

"Responseto the Office Action for European Patent Application No. 16184116.8-1805", Filed Date: Feb. 23, 2017, 6 pages.

"Office Action for European Patent Application No. 16184116.8-1805", dated Mar. 22, 2017, 8 pages.

"Responseto the Office Action Issued in European Patent Application No. 16184116.8", Filed Date: Jul. 20, 2017, 8 pages.

"First Office Action and Search Report Issued in Chinese Patent Application No. 201480038415.6", dated Dec. 1, 2017, 15 Pages.

AUTOMATED VIDEO LOOPING WITH PROGRESSIVE DYNAMISM

RELATED APPLICATION

This application is a continuation of U.S. patent application Ser. No. 15/168,154, filed on May 30, 2016, and entitled "AUTOMATED VIDEO LOOPING WITH PROGRESSIVE DYNAMISM", which is a continuation of U.S. Pat. No. 9,378,578, filed on Feb. 15, 2016, and entitled "AUTOMATED VIDEO LOOPING WITH PROGRESSIVE DYNAMISM", which is a continuation of U.S. Pat. No. 9,292,956, filed on May 3, 2013, and entitled "AUTOMATED VIDEO LOOPING WITH PROGRESSIVE DYNAMISM", the entireties of which are incorporated herein by reference.

BACKGROUND

Visual imagery commonly can be classified as either a static image (e.g., photograph, painting, etc.) or dynamic imagery (e.g., video, animation, etc.). A static image captures a single instant in time. For instance, a static photograph often derives its power by what is implied beyond its spatial and temporal boundaries (e.g., outside the frame and in moments before and after the photograph was taken). Typically, a viewer's imagination can fill in what is left out of the static image (e.g., spatially and/or temporally). In contrast, video loses some of that power; yet, by being dynamic, video can provide an unfolding temporal narrative through time.

Differing types of short videos can be created from an input video. Examples of the short videos include cinemagraphs and cliplets, which selectively freeze, play, and loop video regions to achieve compelling effects. The contrasting juxtaposition of looping elements against a still background can help grab the attention of a viewer. For instance, cinemagraphs can commonly combine static scenes with small repeating movements (e.g., a hair wisp blowing in the wind); thus, some motion and narrative can be captured in a cinemagraph. In a cinemagraph, the dynamic element is commonly looping in a sequence of frames.

Various techniques are conventionally employed to create video loops. For example, some approaches define video textures by locating pairs of similar video frames to create a sparse transition graph. A stochastic traversal of this graph can generate non-repeating video; however, finding compatible frames may be difficult for scenes with many independently moving elements when employing such techniques. Other traditional approaches for creating video loops synthesize videos using a Markov Random Field (MRF) model. Such approaches can successively merge video patches offset in space and/or time, and determine an optimal merging scene using a binary graph cut. Introducing constraints can allow for creation of video loops with a specified global period. Other conventional techniques attempt to create panoramic video textures from a panning video sequence. Accordingly, a user can select a static background layer image and can draw masks to identify dynamic regions. For each region, a natural periodicity can be automatically determined. Then a 3D MRF model can be solved using a multi-label graph cut on a 3D grid. Still other techniques attempt to create panoramic stereo video textures by blending the overlapping video in the space-time volume.

Various approaches for interactive authoring of cinemagraphs have been developed. For example, regions of motion in a video can be automatically isolated. Moreover, a user can select which regions to make looping and which reference frame to use for each region. Looping can be achieved by finding matching frames or regions. Some conventional techniques for creating cinemagraphs can selectively stabilize motions in video. Accordingly, a user can sketch differing types of strokes to indicate regions to be made static, immobilized, or fully dynamic, where the strokes can be propagated across video frames using optical flow. The video can further be warped for stabilization and a 3D MRF problem can be solved to seamlessly merge the video with static content. Other recent techniques provide a set of idioms (e.g., static, play, loop and mirror loop) to allow a user to combine several spatiotemporal segments from a source video. These segments can be stabilized and composited together to emphasize scene elements or to form a narrative.

SUMMARY

Described herein are various technologies that pertain to generating a video loop. An input video can be received, where the input video includes values at pixels over a time range. An optimization can be performed to determine a respective input time interval within the time range of the input video for each pixel from the pixels in the input video. The respective input time interval for a particular pixel can include a per-pixel loop period and a per-pixel start time of a loop at the particular pixel within the time range from the input video. According to an example, a two-stage optimization algorithm can be employed to determine the respective input time intervals. Alternatively, by way of another example, a single-stage optimization algorithm can be employed to determine the respective input time intervals. Moreover, an output video can be created based upon the values at the pixels over the respective input time intervals for the pixels in the input video.

According to various embodiments, a progressive video loop spectrum for the input video can be created based upon the optimization, wherein the progressive video loop spectrum can encode a segmentation (e.g., a nested segmentation, a disparate type of segmentation, etc.) of the pixels in the input video into independently looping spatial regions. The progressive video loop spectrum can include video loops with varying levels of dynamism, ranging from a static image to an animated loop with a maximum level of dynamism. In accordance with various embodiments, the input video can be remapped to form a compressed input video. The compressed input video can include a portion of the input video. The portion of the input video, for example, can be a portion accessed by a loop having a maximum level of dynamism in the progressive video loop spectrum.

In accordance with various embodiments, a selection of a level of dynamism for the output video can be received. Moreover, the output video can be created based upon the values from the input video and the selection of the level of dynamism for the output video. The level of dynamism in the output video can be controlled based upon the selection by causing spatial regions of the output video to respectively be either static or looping. Further, the output video can be rendered on a display screen of a device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
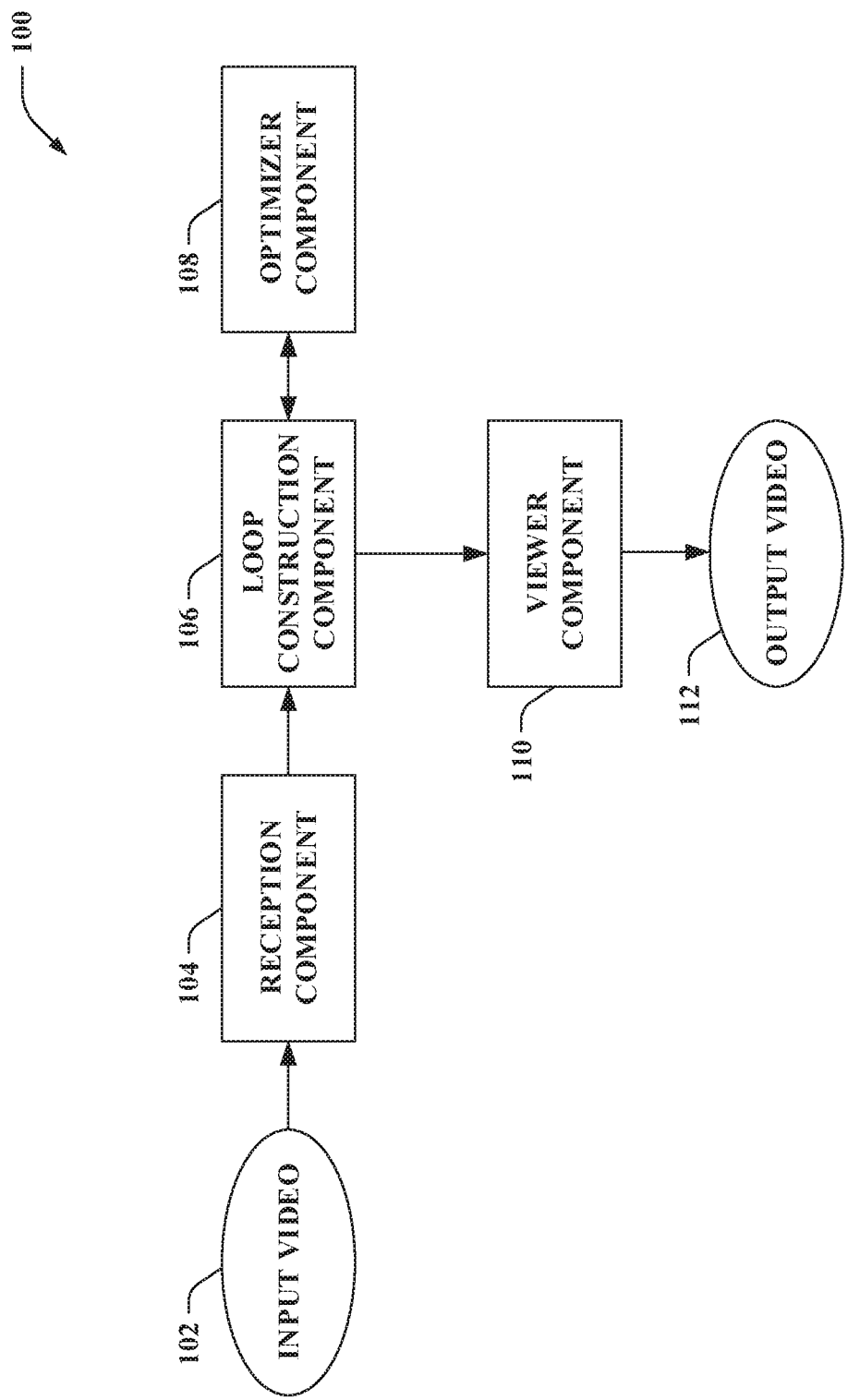
FIG. 1 illustrates a functional block diagram of an exemplary system that generates a video loop from an input video.

Various technologies pertaining to generating a spectrum of video loops with varying levels of dynamism from an input video, where the spectrum of video loops ranges from a static image to an animated loop with a maximum level of dynamism, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a representation that captures a spectrum of looping videos with varying levels of dynamism can be created from an input video. The representation is referred to herein as a progressive video loop spectrum. Video loops in the progressive video loop spectrum range from a static loop to an animated loop that has a maximum level of dynamism. Intermediate loops between the static loop and the loop having the maximum level of dynamism in the progressive video loop spectrum have levels of dynamism between that of the static loop and the loop having the maximum level of dynamism. When creating an output video from the input video and the progressive video loop spectrum, a desired amount of scene liveliness can be interactively adjusted (e.g., using a slider, through local selection of a spatial region, etc.). The output video created as described herein can be utilized for various applications such as for background images or slideshows, where a level of activity may depend on personal taste or mood. Moreover, the representation may segment a scene into independently looping spatial regions, enabling interactive local adjustment over dynamism. For a landscape scene, for example, this control may correspond to selective animation and de-animation of grass motion, water ripples, and swaying trees. The input video can be converted to looping content by employing an optimization in which a per-pixel loop period for each pixel of the input video can be automatically determined. Further, a per-pixel start time for each pixel of the input video can be automatically determined by performing the optimization (e.g., the optimization can simultaneously solve for the per-pixel loop period and the per-pixel start time for each pixel of the input video). Moreover, the resulting segmentation of static and dynamic scene regions can be compactly encoded.

Referring now to the drawings, FIG. 1 illustrates a system 100 that generates a video loop from an input video 102. The system 100 includes a reception component 104 that receives the input video 102, where the input video 102 includes values at pixels over a time range. The input video 102 can be denoted as a three-dimensional (3D) volume V(x,t), with two-dimensional (2D) pixel location x and frame time t. The 2D pixel location x is also referred to herein as the pixel x.

The system 100 automates forming looping content from the input video 102. Certain motions in a scene included in the input video 102 can be rendered in an output video 112. It is contemplated that such motions can be stochastic or semi-periodic such as, for example, swaying grasses, swinging branches, rippling puddles, and pulsing lights. These moving elements in a scene often have different loop periods; accordingly, the system 100 can automatically identify a respective per-pixel loop period for each pixel of the input video 102 as well as a respective per-pixel start time for each pixel of the input video 102. At a given pixel, a combination of a per-pixel loop period and a per-pixel start time can define an input time interval in the input video 102. A length of the input time interval is the per-pixel loop period, and a first frame of the input time interval is the per-pixel start time. Moreover, it is contemplated that some moving objects in the input video 102 can be static (e.g., frozen) in the output video 112

Conventional techniques for forming loops typically rely on user identification of spatial regions of the scene that are looping and user specification of a loop period for each of the identified spatial regions. Such conventional techniques also commonly rely on user identification of spatial regions of the scene that are static. In contrast to traditional approaches, the system 100 formulates video loop creation as an optimization in which a per-pixel loop period can be determined for each pixel of the input video 102. Moreover, it is contemplated that the per-pixel loop period of one or more of the pixels of the input video 102 may be unity, whereby a pixel becomes static. Therefore, the optimization can automatically segment a scene into regions with naturally occurring periods, as well as regions that are static.

Further, looping content can be parameterized to preserve phase coherence, which can cause the optimization to be more tractable. For each pixel, there can be one degree of freedom available to temporally shift a video loop (e.g., the repeating time interval identified from the input video 102 using the per-pixel loop period and the per-pixel start time) in the output video 112. Thus, different delays can be introduced at each pixel, where a delay for a given pixel influences when the given pixel begins a loop in the output video 112. These delays can be set so as to preserve phase coherence, which can enhance spatiotemporal consistency. Accordingly, if two adjacent pixels are assigned the same per-pixel loop period and have respective input time intervals with non-zero overlap, then the pixel values within the time overlap can concurrently appear for both pixels in the output video 112. By way of illustration, if pixel C and pixel D have a common per-pixel loop period, and pixel C has a start frame that is 2 frames earlier than pixel D, then the loop at pixel D in the output video 112 can be shifted by 2 frames relative to the loop at pixel C such that content of the pixel C and the pixel D appears to be synchronized.

The system 100 can be at least part of a dedicated interactive tool that allows the output video 112 to be produced from the input video 102, for example. According to another example, the system 100 can be at least part of a set of dedicated interactive tools, which can include a dedicated interactive tool for forming a video loop from the input video 102 and a disparate dedicated interactive tool for producing the output video 112 from the formed video loop. By way of another example, it is contemplated that the system 100 can be included in a device that captures the input video 102; thus, the system 100 can be configured for execution by a processor of the device that captures the input video 102. Following this example, a camera of a smartphone can capture the input video 102, and a user can employ the smartphone to create the output video 112 using the system 100 (e.g., executed by a processor of the smartphone that captured the input video 102). Pursuant to a further example, a portion of the system 100 can be included in a device that captures the input video 102 (e.g., configured for execution by a processor of the device that captures the input video 102) and a remainder of the system 100 can be included in a disparate device (e.g., configured for execution by a processor of the disparate device); following this example, the portion of the system 100 included in the device that captures the input video 102 can form a video loop, while the remainder of the system 100 included in the disparate device can create the output video 112 from the formed video loop.

The reception component 104 can receive the input video 102 from substantially any source. For example, the reception component 104 can receive the input video 102 from a camera that captures the input video 102. Pursuant to another example, a camera that captures the input video 102 can include the reception component 104. According to another example, the reception component 104 can receive the input video 102 from a data repository that retains the input video 102. It is to be appreciated, however, that the claimed subject matter is not limited to the foregoing examples.

Many types of devices, such as smartphones, cameras, tablet computers, laptop computers, mobile gaming consoles, and the like, can capture the input video 102. For instance, it is to be appreciated that such types of devices can capture high-definition video as well as photographs. Moreover, with increased parallel processing, the gap in resolution between these two media is narrowing. Thus, it may become more commonplace to archive short bursts of video rather than still frames. Accordingly, looping content can be automatically formed from the short bursts of captured video using the system 100.

The input video 102 received by the reception component 104 may have previously been stabilized (e.g., prior to receipt by the reception component 104), for example. According to another example, the input video 102 can be stabilized subsequent to being received by the reception component 104 (e.g., the reception component 104 can stabilize the input video 102, a stabilization component can stabilize the input vide 102, etc.). Stabilization of the input video 102 can be performed automatically or with user guidance.

The system 100 further includes a loop construction component 106 that can cause an optimizer component 108 to perform an optimization to determine a respective input time interval within the time range of the input video 102 for each pixel from the pixels in the input video 102. A respective input time interval for a particular pixel can include a per-pixel loop period and a per-pixel start time of a loop at the particular pixel within the time range from the input video 102. For example, the loop construction component 106 can cause the optimizer component 108 to perform the optimization to determine the respective input time intervals within the time range of the input video 102 for the pixels that optimize an objective function.

Moreover, the system 100 includes a viewer component 110 that can create the output video 112 based upon the values at the pixels over the respective input time intervals for the pixels in the input video 102. The viewer component 110 can generate the output video 112 based upon the video loop created by the loop construction component 106. The output video 112 can include looping content and/or static content. The output video 112 can be denoted as a 3D volume L(x,t), with the 2D pixel location x and frame time t. Moreover, the viewer component 110 can cause the output video 112 to be rendered on a display screen of a device.

The system 100 attempts to maintain spatiotemporal consistency in the output video 112 (e.g., a loop can avoid undesirable spatial seams or temporal pops that can occur when content of the output video 112 is not locally consistent with the input video 102). Due to stabilization of the input video 102, the output video 112 can be formed by the viewer component 110 retrieving, for each pixel of the output video 112, content associated with the same pixel in the input video 102. The content retrieved from the input video 102 and included in the output video 112 by the viewer component 110 can be either static or looping. More particularly, the content can be represented as a temporal interval $[s_x, s_x+p_x)$ from the input video 102, where $s_x$ is a per-pixel start time of a loop for a pixel x and $p_x$ is a per-pixel loop period for the pixel x. The per-pixel start time $s_x$ and the per-pixel loop period $p_x$ can be expressed in units of frames. A static pixel thus corresponds to the case $p_x=1$.

Figure 2:
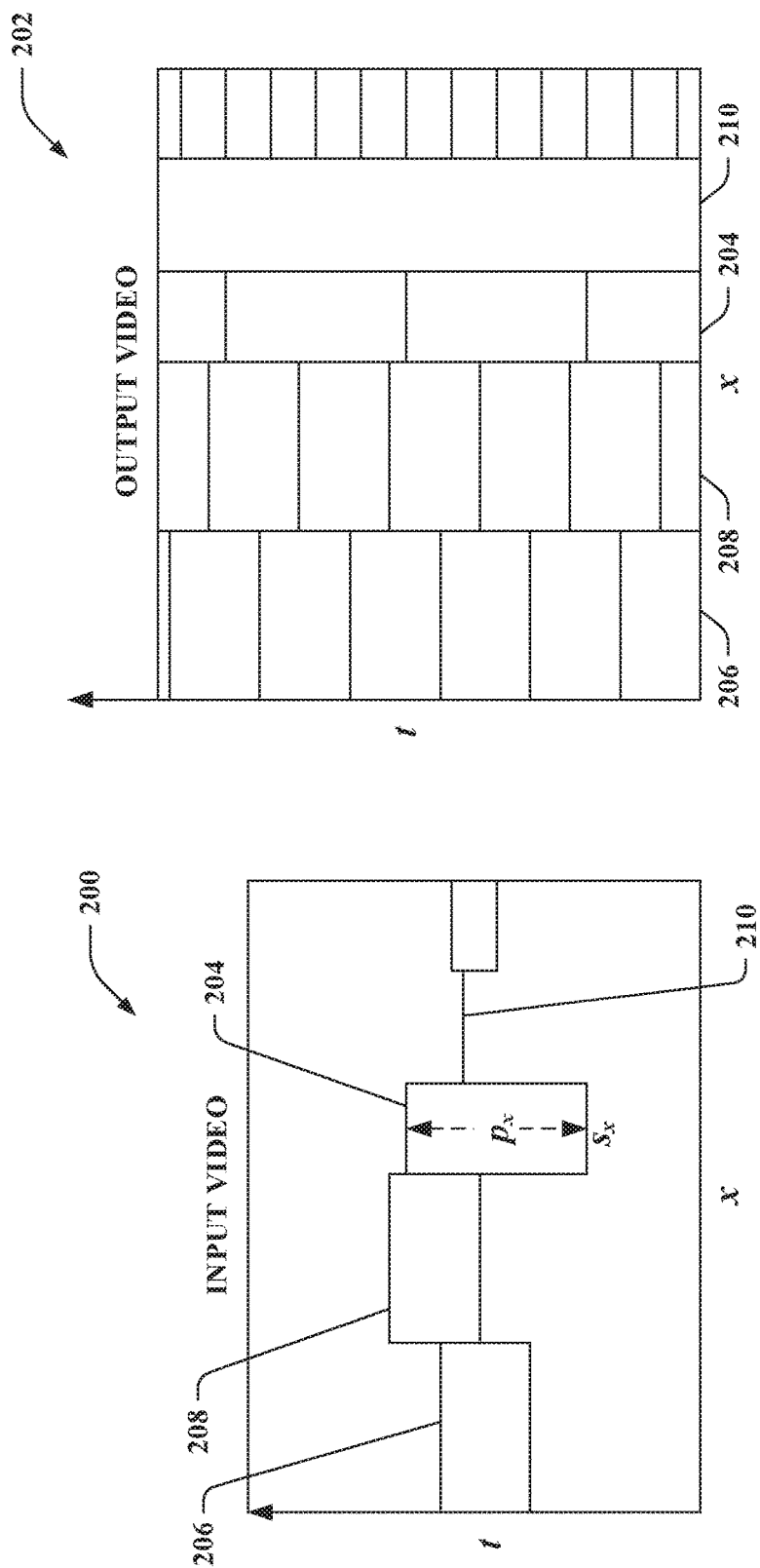
FIG. 2 illustrates an exemplary input video V(x,t) and a corresponding exemplary output video L(x,t).

Turning to FIG. 2, illustrated is an exemplary input video 200, V(x,t), and a corresponding exemplary output video

202, L(x,t). Input time intervals can be determined for each pixel in the input video 200 (e.g., by the loop construction component 106 of FIG. 1). As shown, pixels included in a spatial region 204 of the input video 200 each have a per-pixel start time of $s_x$ and a per-pixel loop period of $p_x$. Further, as depicted, pixels included in a spatial region 206 of the input video 200 and pixels included in a spatial region 208 of the input video 200 each have a common per-pixel loop period; however, a per-pixel start time of the pixels included in the spatial region 206 of the input video 200 differs from a per-pixel start time of the pixels included in the spatial region 208 of the input video 200. Moreover, pixels included in a spatial region 210 of the input video 200 are static (e.g., a unity per-pixel loop period).

Values from the respective input time intervals for the pixels from the input video 200 can be time-mapped to the output video 202. For example, the input time interval from the input video 200 for the pixels included in the spatial region 206 can be looped in the output video 202 for the pixels included in the spatial region 206. Also, as depicted, static values for the pixels included in the spatial region 210 from the specified time of the input video 200 can be maintained for the pixels included in the spatial region 210 over a time range of the output video 202.

The time-mapping function utilized to map the input time intervals from the input video 200 to the output video 202 can preserve phase differences between differing spatial regions, which can assist maintaining spatial consistency across adjacent pixels in differing spatial regions with a common per-pixel loop period and differing per-pixel start times. Thus, an offset between the input time interval for the pixels in the spatial region 206 and the input time interval for the pixels in the spatial region 208 from the input video 200 can be maintained in the output video 202 to provide synchronization.

Again, reference is made to FIG. 1. The viewer component 110 can time-map a respective input time interval for a particular pixel in the input video 102 to the output video 112 utilizing a modulo-based time-mapping function. An output of the modulo-based time-mapping function for the particular pixel can be based on the per-pixel loop period and the per-pixel start time of the loop at the particular pixel from the input video 102. Accordingly, a relation between the input video 102 and the output video 112 can be defined as:

$$L(x,t)=V(x,\phi(x,t)), t \leq 0.$$

In the foregoing, $\phi(x,t)$ is the time-mapping function set forth as follows:

$$\phi(x, t) = \qquad (1)$$
$$s_x - (s_x \bmod p_x) + (t \bmod p_x) + \begin{cases} 0 & \text{if } (t \bmod p_x) \geq (s_x \bmod p_x), \\ p_x & \text{otherwise.} \end{cases}$$

Due to the above modulo arithmetic of the time-mapping function, if two adjacent pixels are looping with the same period in the input video 102, then the viewer component 110 can cause such adjacent pixels to be in-phase in the output video 112 (e.g., in an output loop).

Figure 3:
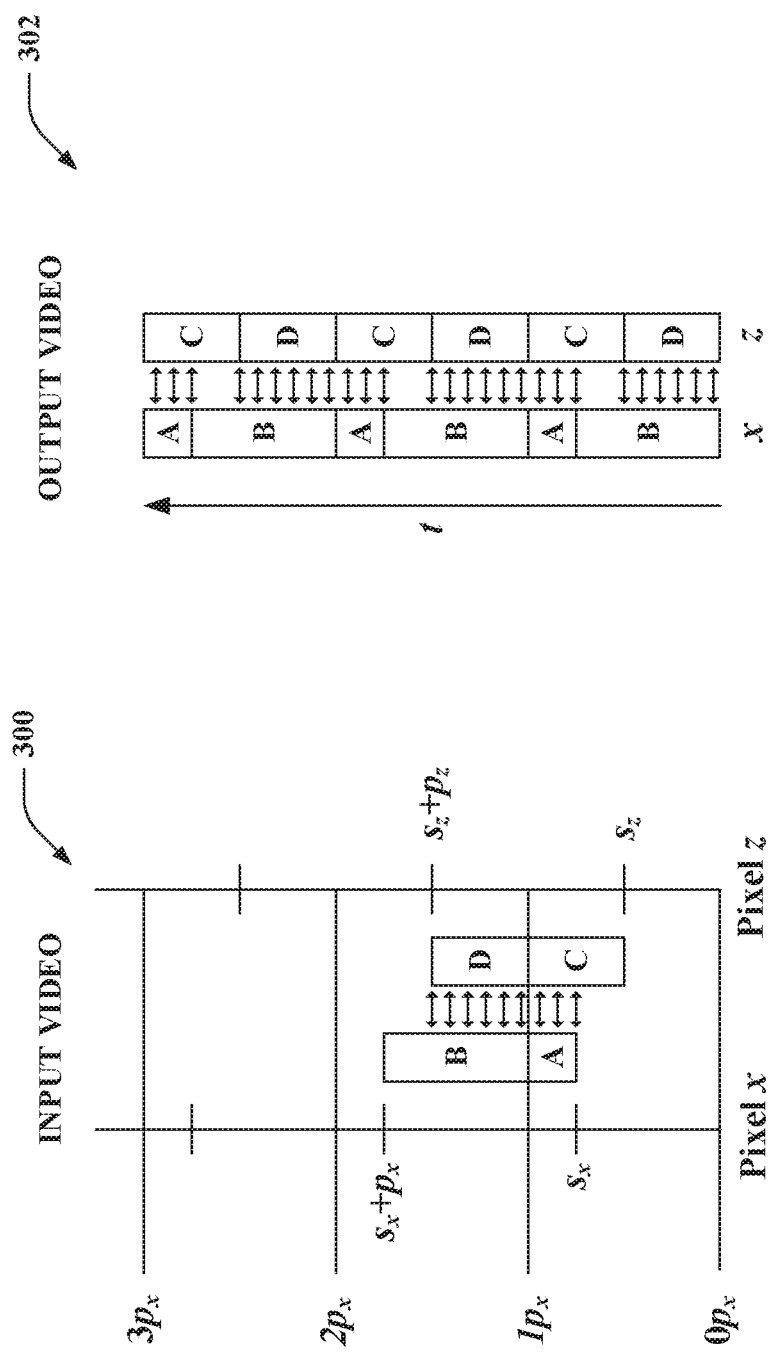
FIG. 3 illustrates an exemplary time-mapping from an input video to an output video.

FIG. 3 illustrates an exemplary time-mapping from an input video 300 to an output video 302. In the depicted example of FIG. 3, pixel x and pixel z are spatially adjacent. The pixels x and z have the same per-pixel loop period, and thus, $p_x = p_z$. Further, a start time for the pixel x, $s_x$, differs from a start time for the pixel z, $s_z$.

Content from the input time interval $[s_x, s_x+p_x)$ of the input video 300 can be retrieved for the pixel x and content from the input time interval $[s_z, s_z+p_z)$ of the input video 300 can be retrieved for the pixel z. Although the start times $s_x$ and $s_z$ differ, the input time intervals can have significant overlap as illustrated by the arrows between the input time intervals in the input video 300. Since the adjacent pixels x and z have the same loop period and similar start times, the in-phase time-mapping function of Equation 1 above can automatically preserve spatiotemporal consistency over a significant portion of the output timeline shown in FIG. 3 for the output video 302 (represented by the arrows). The time-mapping function can wrap the respective input time intervals for the pixel x and the pixel z in the output timeline to maintain adjacency within the temporal overlap, and thus, can automatically preserve spatial consistency.

Solving for start times can encourage phase coherence to be maintained between adjacent pixels. Moreover, loops within the input video 102 can have regions that loop in-phase with a common optimized period, but with staggered per-pixel start times for differing regions. In contrast to determining start times for pixels, some conventional approaches solve for time offsets between output and input videos.

While many of the examples set forth herein pertain to time-mapping where loops from an input video move forward in time in an output video, other types of time-mappings are intended to fall within the scope of the hereto appended claims. For instance, time-mappings such as mirror loops, reverse loops, or reverse mirror loops can be employed, and thus, optimization for such other types of time-mappings can be performed.

Reference is again made to FIG. 1. As set forth herein, the loop construction component 106 can cause the optimizer component 108 to perform the optimization to determine the respective input time intervals within the time range of the input video 102 for the pixels that optimize an objective function. The objective function can include a spatial consistency term, a temporal consistency term, and a dynamism term that penalizes assignment of static loops at the pixels based upon temporal variances of neighborhoods of the pixels in the input video 102. Video loop construction can be formulated as an MRF problem. Accordingly, the per-pixel start times $s=\{s_x\}$ and the per-pixel loop periods $p=\{p_x\}$ that minimize the following objective function can be identified:

$$E(s,p)=E_{consistency}(s,p)+E_{static}(s,p)$$

In the foregoing objective function, the first term can encourage pixel neighborhoods in the video loop to be consistent both spatially and temporally with those in the input video 102. Moreover, the second term in the above noted objective function can penalize assignment of static loop pixels except in regions of the input video 102 that are static. In contrast to conventional approaches, the MRF graph can be defined over a 2D spatial domain rather than a full 3D video volume. Also, in contrast to conventional approaches, the set of unknowns can include a per-pixel loop period at each pixel.

According to an example, the loop construction component 106 can cause the optimizer component 108 to solve the MRF optimization using a multi-label graph cut algorithm, where the set of pixel labels is the outer product of candidate start times {s} and periods {p}. Following this example, the multi-label graph cut algorithm can be a single-stage optimization algorithm that simultaneously solves for per-pixel loop periods and per-pixel start times of the pixels. According to another example, and a two-stage optimization algorithm can be utilized as described in greater detail herein.

In the generated video loop created by the loop construction component 106, spatiotemporal neighbors of each pixel can look similar to those in the input video 102. Because the domain graph is defined on the 2D spatial grid, the objective function can distinguish both spatial and temporal consistency:

$$E_{consistency}(s,p) = \beta E_{spatial}(s,p) + E_{temporal}(s,p).$$

The spatial consistency term $E_{spatial}$ can measure compatibility for each pair of adjacent pixels x and z, averaged over time frames in the video loop.

$$E_{spatial} = \sum_{\|x-z\|=1} \frac{\gamma_s(x,z)}{T}$$

$$\sum_{t=0}^{T-1} (\|V(x, \phi(x,t)) - V(x, \phi(z,t))\|^2 + \|V(z, \phi(x,t)) - V(z, \phi(z,t))\|^2)$$

The period T is the least common multiple (LCM) of the per-pixel loop periods of the pixels in the input video 102. Accordingly, the objective can be formulated as $\lim_{T \to \infty} E_{spatial}$, the average spatial consistency over an infinitely looping video. Further, pixel value differences at both pixels x and z can be computed for symmetry. Moreover, the factor $\gamma_s(x,z)$ can be as follows:

$$\gamma_s(x, z) = \frac{1}{1 + \lambda_s MAD\|V(x,t) - V(z,t)\|}$$

The factor $\gamma_s(x,z)$ can reduce the consistency cost between pixels when the temporal median absolute deviation (MAD) of the color values (e.g., differences of color values) in the input video 102 is large because inconsistency may be less perceptible. It is contemplated that MAD can be employed rather than variance due to MAD being less sensitive to outliers; yet, it is to be appreciated that the claimed subject matter is not so limited. Pursuant to another example, the MAD metric can be defined in terms of respective neighborhoods of the pixel x and the pixel z, instead of single pixel values V(x,t) and V(z,t). According to a further example, $\lambda_s$ can be set to 100; however, the claimed subject matter is not so limited.

The energy $E_{spatial}(x,z)$ can be simplified for various scenarios, which can enable efficient evaluation. According to an exemplary scenario, pixels x and z can both be static. Thus, the energy can reduce to:

$$E_{spatial}(x,z) = \|V(x,s_x) - V(x,s_z)\|^2 + \|V(z,s_x) - V(z,s_z)\|^2.$$

In accordance with another exemplary scenario, pixel x can be static and pixel z can be looping. Accordingly, the energy can simplify to:

$$E_{spatial}(x, z) = \frac{1}{T} \sum_{t=0}^{T-1} \left( \begin{array}{c} \|V(x,s_x) - V(x, \phi(z,t))\|^2 + \\ \|V(z,s_x) - V(z, \phi(z,t))\|^2 \end{array} \right)$$

For each of the two summed vector norms and for each color coefficient $v_c \in V$, the sum can be obtained as:

$$\frac{1}{T} \sum_{t=0}^{T-1} (v_c(x, s_x) - v_c(x, \phi(z,t)))^2 =$$

$$v_c^2(x, s_x) - \frac{2n_c(x, s_x)}{p_z} \sum_{t=s_z}^{s_z+p_z-1} v_c(x,t) + \frac{1}{p_z} \sum_{t=s_z}^{s_z+p_z-1} v_c^2(x,t)$$

The two sums above can be evaluated in constant time by pre-computing temporal cumulative sum tables on V and $V^2$.

In accordance with another exemplary scenario, when both pixels x and z are looping with the same period, $p_x = p_z$, the energy can reduce to:

$$E_{spatial}(x, z) = \frac{1}{p_x} \sum_{t=0}^{p_x-1} \left( \begin{array}{c} \|V(x, \phi(x,t)) - V(x, \phi(z,t))\|^2 + \\ \|V(z, \phi(x,t)) - V(z, \phi(z,t))\|^2 \end{array} \right)$$

Further, the zero value terms for which $\phi(x,t) = \phi(z,t)$ can be detected and ignored. Thus, as previously illustrated in FIG. 3, for the case where start times are similar, significant time intervals marked with arrows in FIG. 3 can be ignored.

According to another exemplary scenario, when the pixels have differing loop periods, generally the sum is computed using $T=LCM(p_x,p_z)$. However, when the two loop periods are relatively prime (e.g., $LCM(p_x,p_z)=p_xp_z$), then the following can be evaluated:

$$\frac{1}{mn} \sum_{i=0}^{m-1} \sum_{j=0}^{n-1} (a_i - b_j)^2 = \frac{1}{m} \sum_{i=0}^{m-1} a_i^2 + \frac{1}{n} \sum_{j=0}^{n-1} b_j^2 - \frac{2}{mn} \left( \sum_{i=0}^{m-1} a_i \right) \left( \sum_{j=0}^{n-1} b_j \right)$$

In the foregoing, a and b correspond to coefficients in V(x;) and V(z;). Thus, the recomputed cumulative sum tables from the exemplary scenario noted above where pixel x is static and pixel z is looping can be reused to evaluate these terms in constant time.

Moreover, it is contemplated that the expected squared difference can be used as an approximation even when the periods $p_x$ and $p_z$ are not relatively prime. Such approximation can provide a speed up without appreciably affecting result quality.

Moreover, as noted above, the objective function can include a temporal consistency objective term $E_{temporal}$.

$$E_{temporal} = \sum_x \left( \begin{array}{c} \|V(x, s_x) - V(x, s_x + p_x)\|^2 + \\ \|V(x, s_x - 1) - V(x, s_x + p_x - 1)\|^2 \end{array} \right) \gamma_t(x)$$

The aforementioned temporal consistency objective term can compare, for each pixel, the value at the per-pixel start time of the loop $s_x$ and the value after the per-pixel end time of the loop $s_x + p_x$ (e.g., from a next frame after the per-pixel end time) and, for symmetry, the value before the per-pixel start time of the loop $s_x - 1$ (e.g., from a previous frame before the per-pixel start time) and the value at the per-pixel end time of the loop $s_x + p_x - 1$.

Because looping discontinuities are less perceptible when a pixel varies significantly over time in the input video 102, the consistency cost can be attenuated using the following factor:

$$\gamma_t(x) = \frac{1}{1 + \lambda_t \mathrm{MAD}\|V(x,t) - V(x,t+1)\|}$$

The foregoing factor can estimate the temporal variation at the pixel based on the median absolute deviation of successive pixel differences. According to an example, $\lambda_t$ can be set to 400; yet, the claimed subject matter is not so limited.

For a pixel assigned as being static (e.g., $p_x=1$), $E_{temporal}$ can compute the pixel value difference between successive frames, and therefore, can favor pixels with zero optical flow in the input video 102. While such behavior can be reasonable, it may be found that moving objects can be inhibited from being frozen in a static image. According to another example, it is contemplated that the temporal energy can be set to zero for a pixel assigned to be static.

According to an example, for looping pixels, a factor of $$\frac{1}{p_x}$$

can be utilized to account for shorter loops revealing temporal discontinuities more frequently relative to longer loops. However, it is to be appreciated that the claimed subject matter is not limited to utilization of such factor.

Moreover, the objective function can include a dynamism term that penalizes assignment of static loops at the pixels based upon temporal variances of neighborhoods of the pixels in the input video 102. For instance, if the pixels of the input video 102 are each assigned to be static from the same input frame, then the loop is spatiotemporally consistent without looping. The dynamism term can penalize such trivial solution and encourage pixels that are dynamic in the input video 102 to be dynamic in the loop.

A neighborhood N of a pixel can refer to a spatiotemporal neighborhood of the pixel. Thus, the neighborhood of a given pixel can be a set of pixels within a specified window in both space and time around the given pixel, optionally weighted by a kernel (e.g., a Gaussian kernel) that reduces influence of pixel values that are farther away in space or time from the given pixel. Moreover, it is contemplated that the specified window for a neighborhood of a given pixel can include the given pixel while lacking other pixels (e.g., a neighborhood of a given pixel in the input video 102 can be the given pixel itself).

The dynamism term $E_{static}$ can be utilized to adjust the energy objective function based on whether the neighborhood N of each pixel has significant temporal variance in the input video 102. If a pixel is assigned a static label, it can incur a cost penalty $c_{static}$. Such penalty can be reduced according to the temporal variance of the neighborhood N of a pixel. Thus, $E_{static} = \Sigma_{x|p_x=1} E_{static}(x)$ can be defined with:

$$E_{static}(x) = c_{static} \min(1, \lambda_{static}) \mathrm{MAD}\|N(x,t) - N(x,t+1)\|$$

In the foregoing, $\lambda_{static}$ can be set to 100, and N can be a Gaussian weighted spatial temporal neighborhood with $\sigma_x=0.9$ and $\sigma_t=1.2$.

Figure 4:
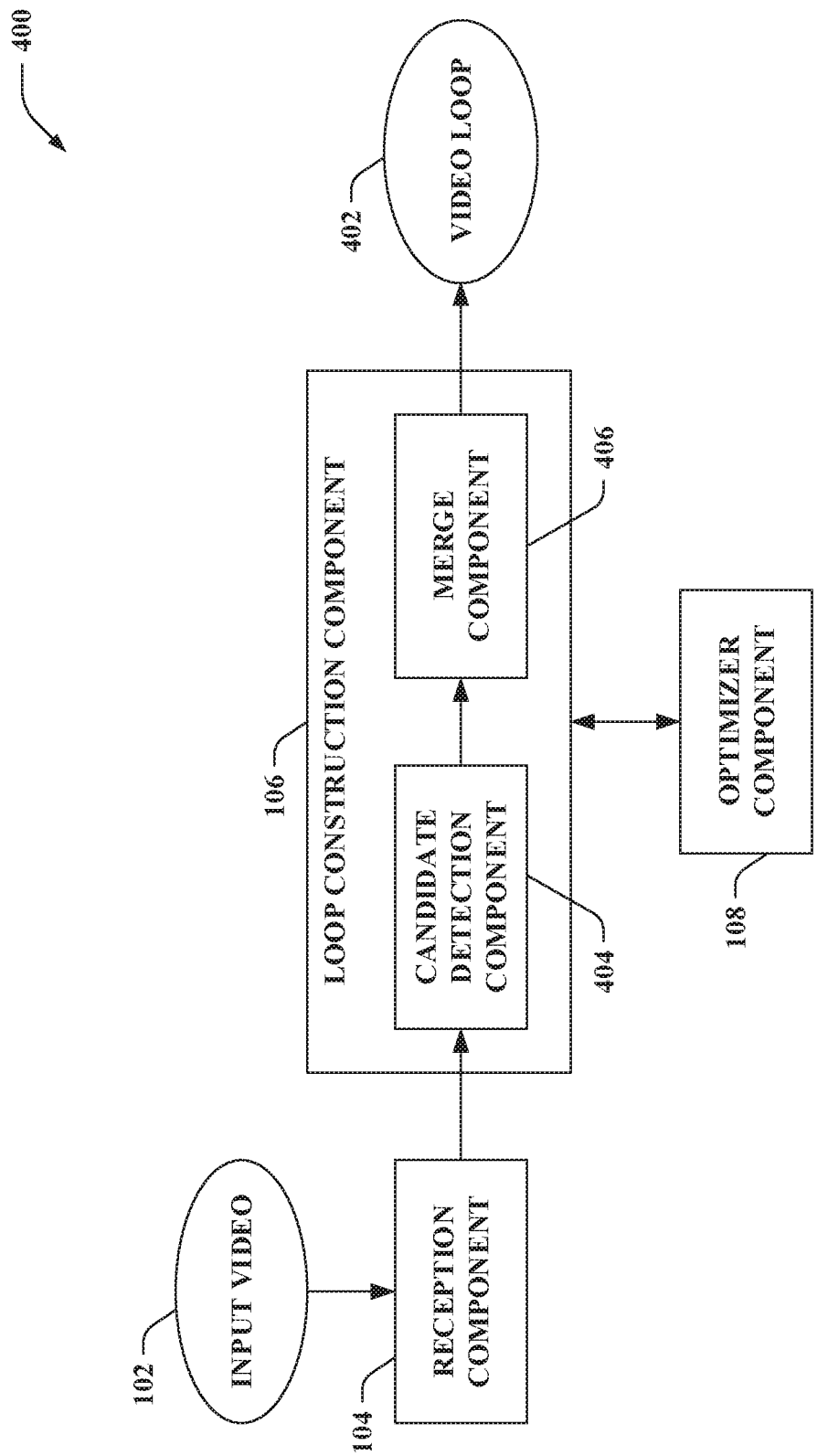
FIG. 4 illustrates a functional block diagram of an exemplary system that generates a video loop from an input video using a two-stage optimization algorithm.

Now turning to FIG. 4, illustrated is a system 400 that generates a video loop 402 from the input video 102 using a two-stage optimization algorithm. The system 400 includes the reception component 104 that receives the input video 102. Moreover, the system 400 includes the loop construction component 106 and the optimizer component 108, which implement the two-stage optimization algorithm to create the video loop 402. Although not shown, it is to be appreciated that the system 400 can further include the viewer component 110 of FIG. 1, which can create an output video from the video loop 402.

The loop construction component 106 can employ a two-stage approach for determining the respective input time intervals for the pixels in the input video 102. More particularly, the loop construction component 106 can include a candidate detection component 404 that forms respective sets of candidate input time intervals within the time range of the input video 102 for the pixels in the input video 102. The candidate detection component 404 can determine respective candidate per-pixel start times within the time range that optimize and objective function for the pixels. The respective candidate per-pixel start times within the time range for the pixels can be determined by the candidate detection component 404 for each candidate loop period. Thus, by way of illustration, the candidate detection component 404 can identify a respective candidate per-pixel start time for each pixel assuming a per-pixel loop period of 2, a respective candidate per-pixel start time for each pixel assuming a per-pixel loop period of 3, and so forth. Accordingly, in the first stage, the candidate detection component 404 can, for each candidate loop period $p>1$, find the per-pixel start times $s_{x|p}$ that create an optimized video loop L|p with that candidate loop period. The optimizer component 108 can solve a multi-label graph cut for each candidate loop period, and the candidate detection component 404 can identify the respective candidate per-pixel starts times for the pixels based upon results returned by the optimizer component 108 for each candidate loop period.

Moreover, the loop construction component 106 can include a merge component 406 that can determine the respective input time intervals within the time range of the input video 102 for the pixels that optimize the objective function. The respective input time intervals within the time range of the input video 102 for the pixels can be selected by the merge component 406 from the respective sets of candidate input time intervals within the time range of the input video 102 for the pixels in the input video 102 as determined by the candidate detection component 404. Thus, the merge component 406 can determine per-pixel loop periods $p_x \geq 1$ that define the optimized video loop ($p_x$, $s_{x|p_x}$) using the per-pixel start times obtained by the candidate detection component 404 (e.g., in the first stage). The optimizer component 108 can solve a multi-label graph cut, and the merge component 406 can identify the respective per-pixel loop periods for the pixels based upon results returned by the optimizer component 108. The set of labels utilized by the optimizer component 108 for the second stage can include the periods $p>1$ considered in the first stage together with possible static frames $s'_x$ for the static case $p=1$. Thus, the optimization can merge together regions of $|\{p\}|+|\{s\}|$ different candidate loops: the optimized loops found in the first stage for periods $\{p\}$ plus the static loops corresponding to the frames $\{s\}$ of the input video 102.

The optimizer component 108 can solve the multi-label graph cuts in both stages using an iterative alpha-expansion algorithm. The iterative alpha-expansion algorithm can assume a regularity condition on the energy function, namely that for each pair of adjacent nodes and three labels $\alpha$, $\beta$, $\gamma$, the spatial cost can satisfy $c(\alpha,\alpha)+c(\beta,\gamma) \leq c(\alpha,\beta)+c(\alpha,\gamma)$. Yet, it is to be appreciated that the foregoing constraint may not be satisfied in the second stage. For instance, the constraint may not be satisfied when two adjacent pixels are assigned the same period since they may have different per-pixel start times, which can mean that their spatial costs $c(\alpha,\alpha)$ may be nonzero. However, the per-pixel start times can be solved in the first stage to minimize this cost, so the foregoing difference may likely be mitigated.

Since the regularity condition may not hold, the theoretical bounded approximation guarantees of the alpha-expansion algorithm may not hold. Yet, some edge costs can be adjusted when setting up each alpha-expansion pass by the optimizer component 108. More particularly, the optimizer component 108 can add negative costs to the edges $c(\beta,\gamma)$, such that the regularity condition is satisfied. Moreover, another reason that the energy function may be irregular is that the square root of $E_{spatial}(x,z)$ can be applied to make it a Euclidean distance rather than a squared distance; yet, the claimed subject matter is not so limited.

Since the iterative multi-label graph cut algorithm may find a local minimum of the objective function, it can be desired to select the initial state. More particularly for the first stage, the candidate detection component 404 can initialize $s_x$ to minimize temporal cost. Further, for the second stage, the merge component 406 can select $p_x$, whose loop $L|p_x$ has a minimum spatiotemporal cost at pixel x.

Again, while FIG. 4 describes a two-stage optimization algorithm for generating the video loop 402 from the input video 102, it is to be appreciated that alternatively a single-stage optimization algorithm can be employed to generate the video loop 402 from the input video 102. Thus, following this example, a single-stage multi-label graph cut algorithm that simultaneously solves for both per-pixel loop periods and per-pixel start times for each pixel can be implemented. While many of the examples set forth herein pertain to utilization of the two-stage optimization algorithm, it is contemplated that such examples can be extended to use of the single-stage optimization algorithm.

Figure 5:
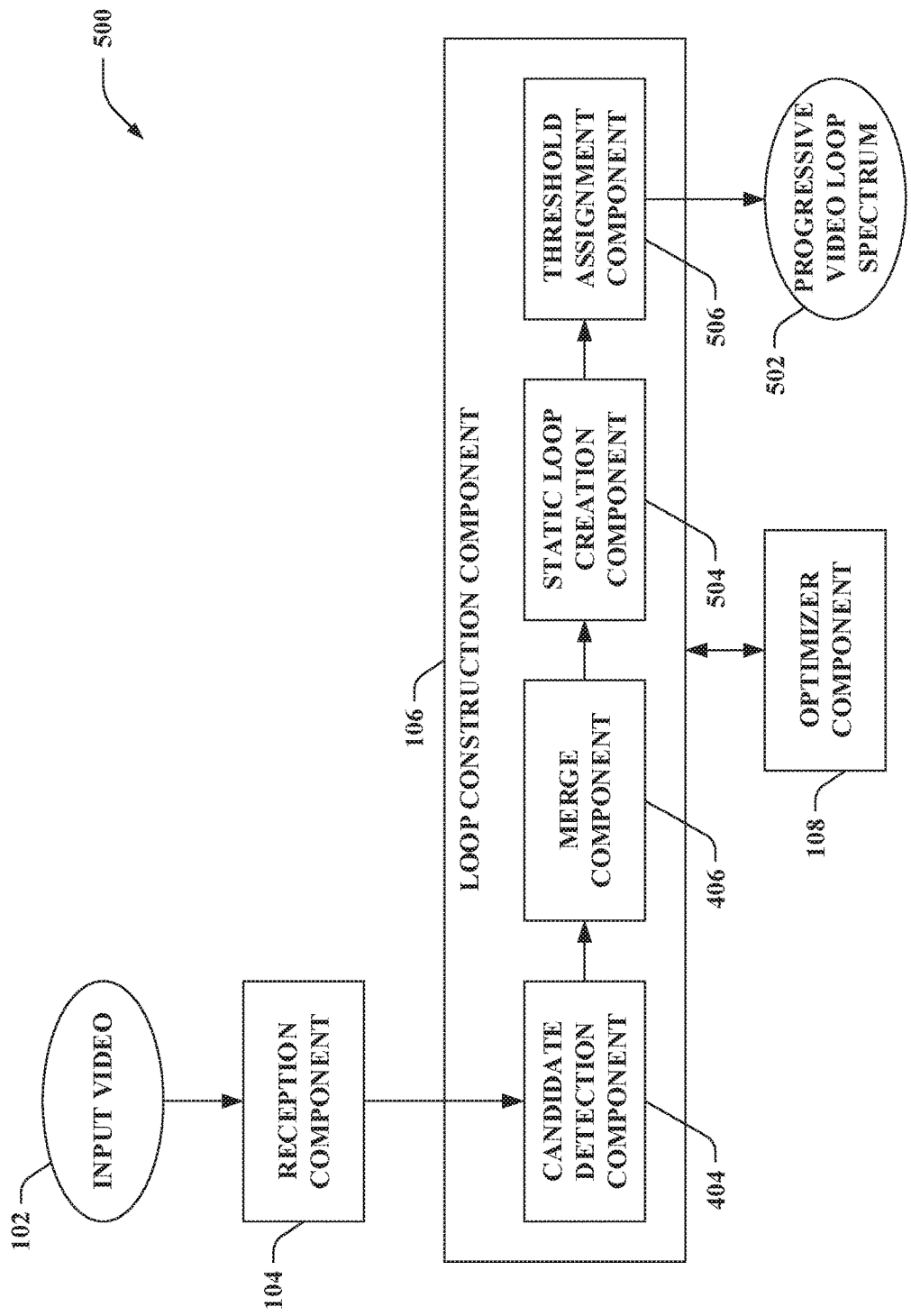
FIG. 5 illustrates a functional block diagram of an exemplary system that generates a progressive video loop spectrum from an input video.

Referring now to FIG. 5, illustrated is a system 500 that generates a progressive video loop spectrum 502 from the input video 102. Similar to the system 400 of FIG. 4, the two-stage optimization algorithm can be implemented by the system 500 to form the progressive video loop spectrum 502. The progressive video loop spectrum 502 captures a spectrum of loops from the input video 102 with varying levels of dynamism, ranging from a static loop to a loop having a maximum level of dynamism.

The system 500 includes the reception component 104, the loop construction component 106, and the optimizer component 108. Again, although not shown, it is contemplated that the system 500 can include the viewer component 110 of FIG. 1. The loop construction component 106 further includes the candidate detection component 404 and the merge component 406 as described herein.

The loop construction component 106 can create the progressive video loop spectrum 502, represented as $\mathcal{L} = \{L_d | 0 \leq d \leq 1\}$, where d refers to a level of dynamism. The level of dynamism can be a normalized measure of the temporal variance in a video loop. At one end of the progressive video loop spectrum 502 is a loop $L_0$ having a minimum level of dynamism (e.g., a static loop). It is to be appreciated that at least two of the pixels in the static loop $L_0$ can be from differing frames of the input video 102; yet, the claimed subject matter is not so limited. At the other end of the progressive video loop spectrum 502 is a loop $L_1$ having a maximum level of dynamism, which can have many of its pixels looping. In the loop $L_1$, it is to be appreciated that some pixels may not be looping (e.g., one or more pixels may be static), since forcing pixels with non-loopable content to loop may cause undesirable artifacts.

To define the progressive video loop spectrum 502, each pixel can have one of two possible states, namely, a static state and a looping state. In the static state, a color value for the pixel can be taken from a single static frame $s'_x$ of the input video 102. In the looping state, a pixel can have a looping interval $[s_x, s_x+p_x)$ that includes the static $s'_x$. Moreover, the loop construction component 106 can establish a nesting structure on the set of looping pixels by defining an activation threshold $a_x \in [0,1)$ as the level of dynamism at which pixel x transitions between static and looping.

Figure 6:
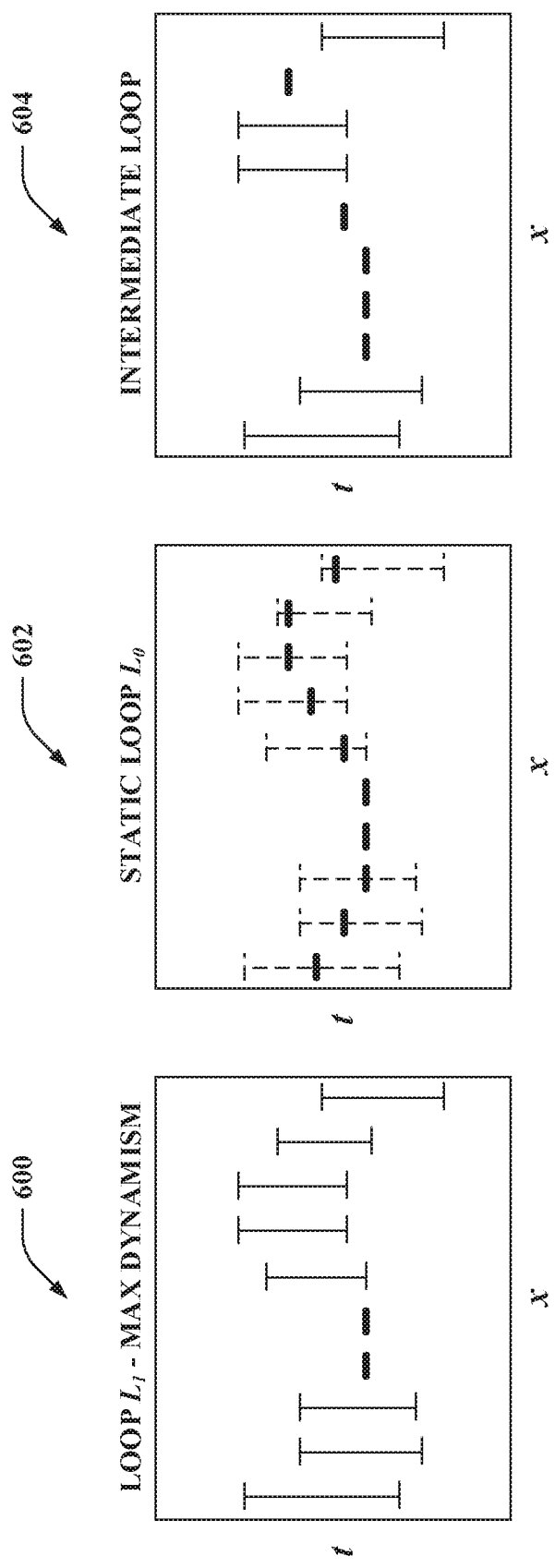
FIG. 6 illustrates exemplary loops of a progressive video loop spectrum generated by the system of FIG. 5.

Referring to FIG. 6, illustrated are exemplary loops of a progressive video loop spectrum (e.g., the progressive video loop spectrum 502 of FIG. 5). A loop $L_1$ having a maximum level of dynamism is depicted at 600, a static loop $L_0$ having a minimum level of dynamism is depicted at 602, and an intermediate loop having a level of dynamism between the loop $L_1$ and the loop $L_0$ is depicted at 604. Looping parameters for the static loop $L_0$ and the subsequent intermediate loops of the progressive video loop spectrum are constrained to be compatible with previously computed loops (e.g., looping parameters for the static loop $L_0$ are constrained to be compatible with the loop $L_1$, looping parameters of the intermediate loop depicted at 604 are constrained to be compatible with the loop $L_1$ and the loop $L_0$, etc.).

As shown in the illustrated example, the loop $L_1$ includes two pixels that are static (e.g., in the static state), while the remaining pixels have respective per-pixel loop periods greater than 1 (e.g., in the looping state). Moreover, as depicted, the static loop $L_0$ can include a value from a static time within an input time interval for each pixel (e.g., each pixel can be in the static state). Further, for the intermediate loop, each pixel can either be in the looping state from the loop $L_1$ or the static state from the static loop $L_0$.

Again, reference is made to FIG. 5. The loop construction component 106 can include a static loop creation component 504 that determines a respective static time for each pixel from the pixels in the input video 102 that optimizes an objective function. The respective static time for the particular pixel can be a single frame selected from within the respective input time interval for the particular pixel (e.g., determined by the candidate detection component 404 and the merge component 406 as set forth in FIG. 4). Moreover, the respective static times for the pixels in the input video 102 can form the static loop $L_0$.

The loop construction component 106 can further include a threshold assignment component 506 that assigns a respective activation threshold for each pixel from the pixels in the input video 102. The respective activation threshold for the particular pixel can be a level of dynamism at which the particular pixel transitions between static and looping.

A progressively dynamic video loop from the progressive video loop spectrum 502 can have the following time-mapping:

$$\phi_d(x, t) = \begin{cases} s'_x & \text{if } d \leq a_x \\ \phi(x, t) & \text{otherwise} \end{cases}.$$

According to an example, if the level of dynamism d for the loop is less than or equal to the activation threshold $a_x$ at a given pixel x, then the pixel x is static; thus, the output pixel value for the pixel x is taken from a value at the static frame $s'_x$ from the input video 102. Following this example, the output pixel value does not vary as a function of the output time t. Alternatively, in accordance with another example, if the level of dynamism d for the loop is greater than the activation threshold $a_x$ at the given pixel x, then the pixel x is looping; hence, the output pixel value for the given pixel x is retrieved using the aforementioned time-mapping function $\phi(x,t)$, which was computed for the loop $L_1$ having the maximum level of dynamism (e.g., based upon the per-pixel loop period $p_x$ and the per-pixel start time $s_x$).

As noted above, the threshold assignment component 506 can determine the activation threshold $a_x$ and the static loop creation component 504 can determine the static frames $s'_x$. Moreover, the candidate detection component 404 and the merge component 406 can determine the per-pixel loop start time $s_x$ and the per-pixel loop period $p_x$ at each pixel to provide video loops in the progressive video loop spectrum 502 $\mathcal{L}$ with optimized spatiotemporal consistency. Accordingly, the loop construction component 106 can create the progressive video loop spectrum 502 for the input video 102 based upon the respective per-pixel loop periods, the respective per-pixel start times, the respective static times, and the respective activation thresholds for the pixels in the input video 102. The progressive video loop spectrum 502 can encode a segmentation of the pixels in the input video 102 into independently looping spatial regions. For example, a nested segmentation can be encoded; yet, the claimed subject matter is not so limited.

Figure 7:
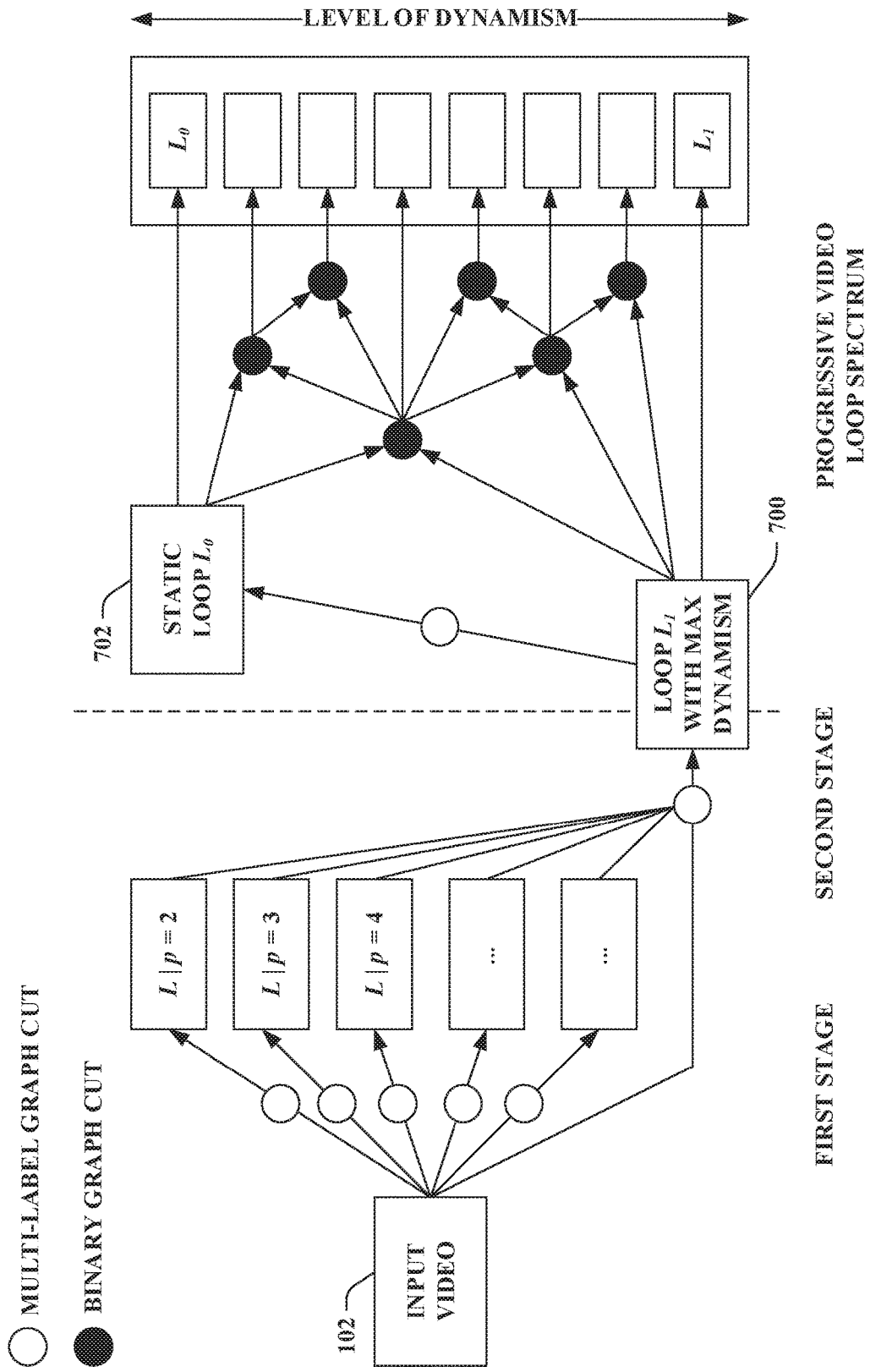
FIG. 7 illustrates an exemplary graphical representation of construction of the progressive video loop spectrum implemented by the system of FIG. 5.

Turning to FIG. 7, illustrated is an exemplary graphical representation of construction of a progressive video loop spectrum implemented by the system 500 of FIG. 5. White circles in FIG. 7 denote multi-label graph cuts and black circles in FIG. 7 denote binary graph cuts. The multi-label graph cuts and the binary graph cuts can be performed by the optimizer component 108 (or a plurality of optimizer components).

As described above, the two-stage optimization algorithm can be employed to create a loop $L_1$ 700 having a maximum level of dynamism from the input video 102. For instance, $c_{static}$ can be set to a value such as 10 to form the loop $L_1$ 700; yet, the claimed subject matter is not so limited.

Subsequent to generation of the loop $L_1$ 700, a static loop $L_0$ 702 (e.g., reference image) can be created (e.g., by the static loop creation component 504 of FIG. 5). The static loop $L_0$ 702 can be generated by leaving as-is pixels that are static in the loop $L_1$ 700. Further, static frames $s'_x$ can be solved for each remaining pixel (e.g., pixels that are not static in the loop $L_1$ 700).

Having obtained the parameters $(s'_x, s_x, p_x)$, which define the two loops $\{L_0, L_1\} \subset \mathcal{L}$, an activation threshold $a_x$ can be assigned at each pixel to establish the progressive video loop spectrum $\mathcal{L}$. The foregoing can use a recursive binary partition over $c_{static}$ between the loop $L_0$ 700 and the loop $L_1$ 702. The threshold assignment component 506 of FIG. 5 can determine the activation threshold $a_x$ of each pixel through the set of binary graph cuts (represented by the tree of black circles in FIG. 7).

Again, reference is made to FIG. 5. The progressive video loop spectrum 502 $\mathcal{L}$ can be parameterized using the static cost parameter $c_{static}$, which can be varied during construction by the threshold assignment component 506. However, the level of activity in a loop often changes non-uniformly with the static cost parameter $c_{static}$, and such non-uniformity can differ significantly across videos. Thus, according to another example, the progressive video loop spectrum 502 can be parameterized using a normalized measure of temporal variance within the loop, set forth as follows:

$$\text{Var}(L) = \sum_x \text{Var}_{s_x \le t < s_x + p_x}(V(x, t))$$

Var(L) can measure the temporal variance of pixels in a video loop L. The level of dynamism can be defined as the temporal variance normalized relative to the loop $L_1$ having the maximum level of dynamism:

$$\text{LOD}(L) = \text{Var}(L)/\text{Var}(L_1)$$

Thus, as defined, the loop $L_1$ having a maximum level of dynamism has $\text{LOD}(L_1)=1$ and the static loop $L_0$ has $\text{LOD}(L_0)=0$.

The static loop creation component 504 can obtain the static loop $L_0$ by using the optimizer component 108 to perform the optimization where $c_{static}=0$. Further, the static loop creation component 504 can enforce the constraint $s_x \le s'_x < s_x + p_x$ (e.g., as illustrated in FIG. 6). Moreover, the static loop creation component 504 can employ a data term that penalizes color differences from each static pixel to its corresponding median value in the input video 102. Encouraging median values can help create a static image that represents a still moment free of transient objects or motions; yet, the claimed subject matter is not limited to the foregoing example.

Moreover, the threshold assignment component 506 can assign the activation thresholds as follows. For each pixel x looping in the loop $L_1$ having the maximum level of dynamism, transitions for such pixels from static to looping occurs between loops $L_0$ and $L_1$, and therefore, respective activation thresholds for such pixels satisfy $0 \le a_x < 1$. Accordingly, the threshold assignment component 506 forms an intermediate loop by setting $$c_{static} = \frac{(0 + c_{max})}{2}$$

(e.g., mid-point between the settings for $L_0$ and $L_1$) and constraining each pixel x to be either static as in the loop $L_0$ or looping as in the loop $L_1$. The threshold assignment component 506 can employ the optimizer component 108 to minimize E using a binary graph cut. Let d be a level of dynamism of a resulting loop, and thus, the loop is denoted $L_d$. The assignment of each pixel as static or looping in loop $L_d$ introduces a further inequality constraint on its activation threshold $a_x$ (e.g., either $a_x < d$ for looping pixels in $L_d$ or $a_x \ge d$ for static pixels in $L_d$). Hence, the threshold assignment component 506 can further partition the intervals $[L_0, L_d]$ and $[L_d, L_1]$ recursively to define $a_x$ at the pixels of the input video 102.

In the limit of the recursive subdivision, the activation threshold to which each pixel converges can be a unique value. Recursion can terminate when the change in the static cost parameter $c_{static}$ becomes sufficiently small (e.g., $<1.0e-6$) or when the difference between the level of dynamism of the two loops is sufficiently small (e.g., $<0.01$). As a post-process, each activation level can be adjusted by the threshold assignment component 506 to lie at a midpoint of a vertical step as opposed to at a maximum (or a minimum) of such step; yet, the claimed subject matter is not so limited.

In the progressive video loop spectrum 502, there may be intervals of dynamism over which the loop does not change. Such discontinuities can exist since the dynamism level is continuous whereas the set of possible loops is finite. A size of some intervals may increase due to spatiotemporal consistency leading to some spatial regions that transition coherently. Accordingly, some videos can have significant jumps in dynamism. To reduce these jumps, the spatial cost parameter β can be reduced (e.g., from 10 to 5) by the threshold assignment component 506 for computation of the activation thresholds; however, the claimed subject matter is not so limited as such reduction in β may lead to more noticeable spatial seams.

According to another example, the activation threshold for subtle loops (e.g., loops with less activity) can be smaller than the activation threshold for highly dynamic loops. With $E_{static}$ as defined above, varying $c_{static}$ can have an effect such that when $c_{static}$ is low (e.g., near the static loop $L_0$), pixels with high temporal variance can benefit from a greatest drop in $E_{static}$; conversely, when $c_{static}$ is high (e.g., near the loop $L_1$), pixels with low temporal variance have sufficiently small $E_{static}$ penalties. Thus, loops with higher levels of activity can transition from static to looping before loops with lower levels of activity (as activation threshold increases). To address the foregoing, $E_{static}$ can be redefined for use by the threshold assignment component 506 (e.g., without being redefined for use by the candidate detection component 404, the merge component 406, or the static loop creation component 504) as $E_{static}(x) = c_{static}(1.05 - \min(1, \lambda_{static} \text{MAD}_t \| N(x,t) - N(x,t+1) \|))$. Because the loops $L_0$ and $L_1$ bounding of the recursive partitioning process are fixed, the effect can be to modify the activation thresholds and thereby reorder the loops (e.g., with subtle loops having smaller activation thresholds as compared to more dynamic loops).

According to another example, the respective input time intervals within the time range for the pixels of the input video 102 can be determined at a first spatial resolution (e.g., low spatial resolution). Moreover, the respective input time intervals within the time range for the pixels of the input video 102 can be up-sampled to a second spatial resolution. Following this example, the second spatial resolution can be greater than the first spatial resolution. Thus, the looping parameters computed at the lower resolution can be up-sampled and used for a high resolution input video.

Figure 8:
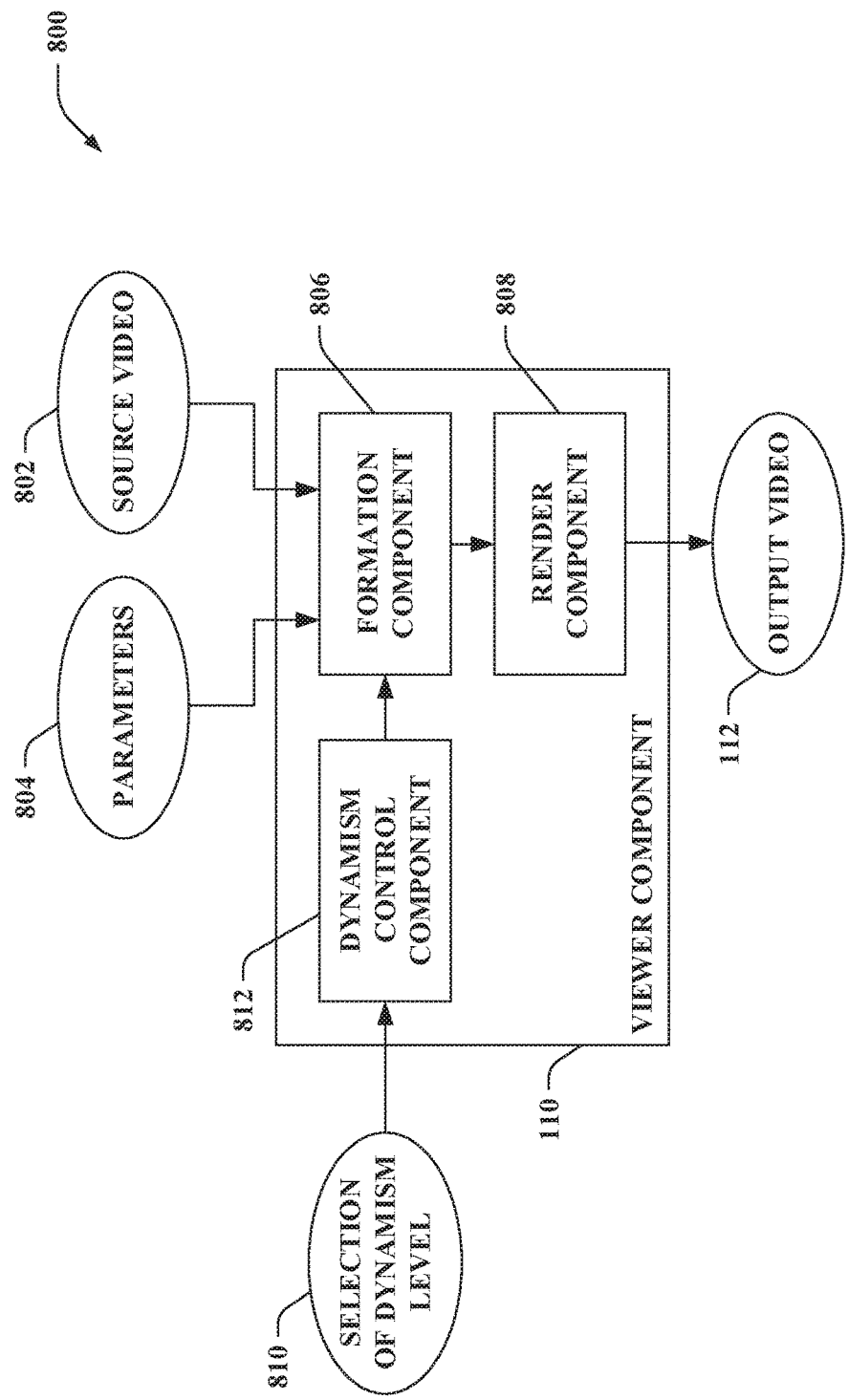
FIG. 8 illustrates a functional block diagram of an exemplary system that controls rendering of an output video.

Turning to FIG. 8, illustrated is a system 800 that controls rendering of the output video 112. The system 800 includes the viewer component 110, which can obtain a source video 802. The source video 802, for example, can be the input video 102 of FIG. 1. According to another example, the source video 802 can be a compressed input video as described in greater detail herein. Moreover, the viewer component 110 can obtain parameters 804 of the progressive video loop spectrum 502 generated by the loop construction component 106 of FIG. 5. The parameters 804 can include, for each pixel, the per-pixel start times $s'_x$, the per-pixel loop period $p_x$, the static time $s'_x$, and the activation threshold $a_x$. By way of another example (where the source video 802 is the compressed input video), the parameters 804 can be adjusted parameters as set forth in further detail herein.

The viewer component 110 can include a formation component 806 and a render component 808. The formation component 806 can create the output video 112 based upon the source video 802 and the parameters 804. The parameters 804 can encode a respective input time interval within a time range of the source video 802 for each pixel in the source video 802. Moreover, a respective input time interval for a particular pixel can include a per-pixel loop period of a loop at the particular pixel within the time range from the source video 802. The respective input time interval for the particular pixel can also include a per-pixel start time of the loop at the particular pixel within the time range from the source video 802. Further, the render component 810 can render the output video on a display screen of a device.

Further, the viewer component 110 can receive a selection of a level of dynamism 810 for the output video 112 to be created by the formation component 806 from the source video 802 based upon the parameters 804. According to an example, the selection of the level of dynamism 810 can be a selection of a global level of dynamism across pixels of the source video 802. Additionally or alternatively, the selection of the level of dynamism 810 can be a selection of a local level of dynamism for a portion of the pixels of the source video 802 (e.g., one or more spatial regions). Further, the viewer component 110 can include a dynamism control component 812. More particularly, the dynamism control component 812 can control a level of dynamism in the output video 112 based upon the selection of the level of dynamism 810. Accordingly, the output video 112 can be created by the formation component 806 based upon values of the source video 802 and the selection of the level of dynamism 810 for the output video 112, where the dynamism control component 812 can control the level of dynamism in the output video 112 by causing spatial regions of the output video 112 to respectively be either static or looping (e.g., a first spatial region can be static or looping, a second spatial region can be static or looping, etc.). Moreover, the render component 808 can cause the output video 112 to be rendered on a display screen of a device.

By way of illustration, the selection of the level of dynamism 810 can be based upon user input. For instance, a graphical user interface can be presented to a user, and user input related to content of the graphical user interface can indicate the selection of the level of dynamism 810. Yet, it is contemplated that the selection of the level of dynamism can be obtained from substantially any other source other than user input, can be periodically or randomly varied, etc.

According to an example, the level of dynamism in the output video 112 can be globally controlled by the dynamism control component 812 across the pixels of the output video 112 based upon the selection of the level of dynamism 810. By way of illustration, a slider can be included as part of a graphical user interface rendered on a display screen, where the global level of dynamism is controlled based upon position of the slider. As the slider is manipulated to increase the level of dynamism, the output video 112 created by the formation component 806 can become more dynamic (e.g., more pixels can transition from static to looping such that the rendered loop becomes more similar to the loop $L_1$ having the maximum level of dynamism). Further, as the slider is manipulated to decrease the level of dynamism, the output video 112 created by the formation component 806 can become less dynamic (e.g., more pixels can transition from looping to static such that the rendered loop becomes more similar to the static loop $L_0$). While utilization of a slider is described in the foregoing example, it is to be appreciated that substantially any type of switch, button, key, etc. included in the graphical user interface can obtain the selection of the level of dynamism 810. Further, substantially any other type of interfaces, such as a natural user interface, can accept the selection of the level of dynamism 810.

By way of another example, the level of dynamism in the output video 112 can be locally controlled within an independently looping spatial region in the output video 112 based upon the selection of the level of dynamism 810. For instance, the per-pixel loop periods and activation levels can induce a segmentation of a scene into independently looping regions. Thus, rather than using a single path to globally increase or decrease dynamism globally across the pixels of the output video 112, dynamism can be controlled locally (e.g., based on manual input). Thus, the selection of the level of dynamism 810 can adapt dynamism spatially by selectively overriding the looping state per spatial region (e.g., a tree included in the source video 802 can be selected to transition from static to looping, etc.).

For fine grain control, it can be desirable for a selectable region to be small yet sufficiently large to avoid spatial seams when adjacent regions have different states. For instance, two adjacent pixels can be in a common region if the pixels share the same loop period, have respective input time intervals from the source video 802 that overlap, and have a common activation level. By way of example, a flood-fill algorithm can find equivalence classes for the transitive closure of this relation; yet, the claimed subject matter is not so limited.

By way of illustration, the viewer component 110 can provide a graphical user interface to manipulate dynamism over different spatial regions. For instance, as a cursor hovers over the output video 112, a local underlying region can be highlighted. Other regions can be shaded with a color coded or otherwise indicated to delineate each region and its current state (e.g., shades of red for static and shades of green for looping). The selection of the level of dynamism 810 can be based upon a mouse click or other selection on a current highlighted spatial region, which can toggle a state of the highlighted spatial region between looping and static. According to another example, dragging a cursor can start the drawing of a stroke. Following this example, regions that overlap the stroke can be activated or deactivated depending on whether a key is pressed (e.g., a shift key). It is to be appreciated, however, that the claimed subject matter is not limited to the foregoing examples. Also, it is contemplated that other types of interfaces again can be utilized to accept the selection of the level of dynamism 810.

It is contemplated that the viewer component 110 can receive the input video 102 of FIG. 1 and parameters 804, for example. Additionally or alternatively, the viewer component 110 can receive a compressed input video and adjusted parameters as described in greater detail herein, for example. Following this example, the output video 112 can be created by the formation component 806 from the compressed input video based upon the adjusted parameters (e.g., the level of dynamism can be controlled based upon the selection of the level of dynamism 810). Thus, the viewer component 110 can creates the output video 112 based upon the values at the pixels over respective input time intervals for the pixels in the compressed input video.

Figure 9:
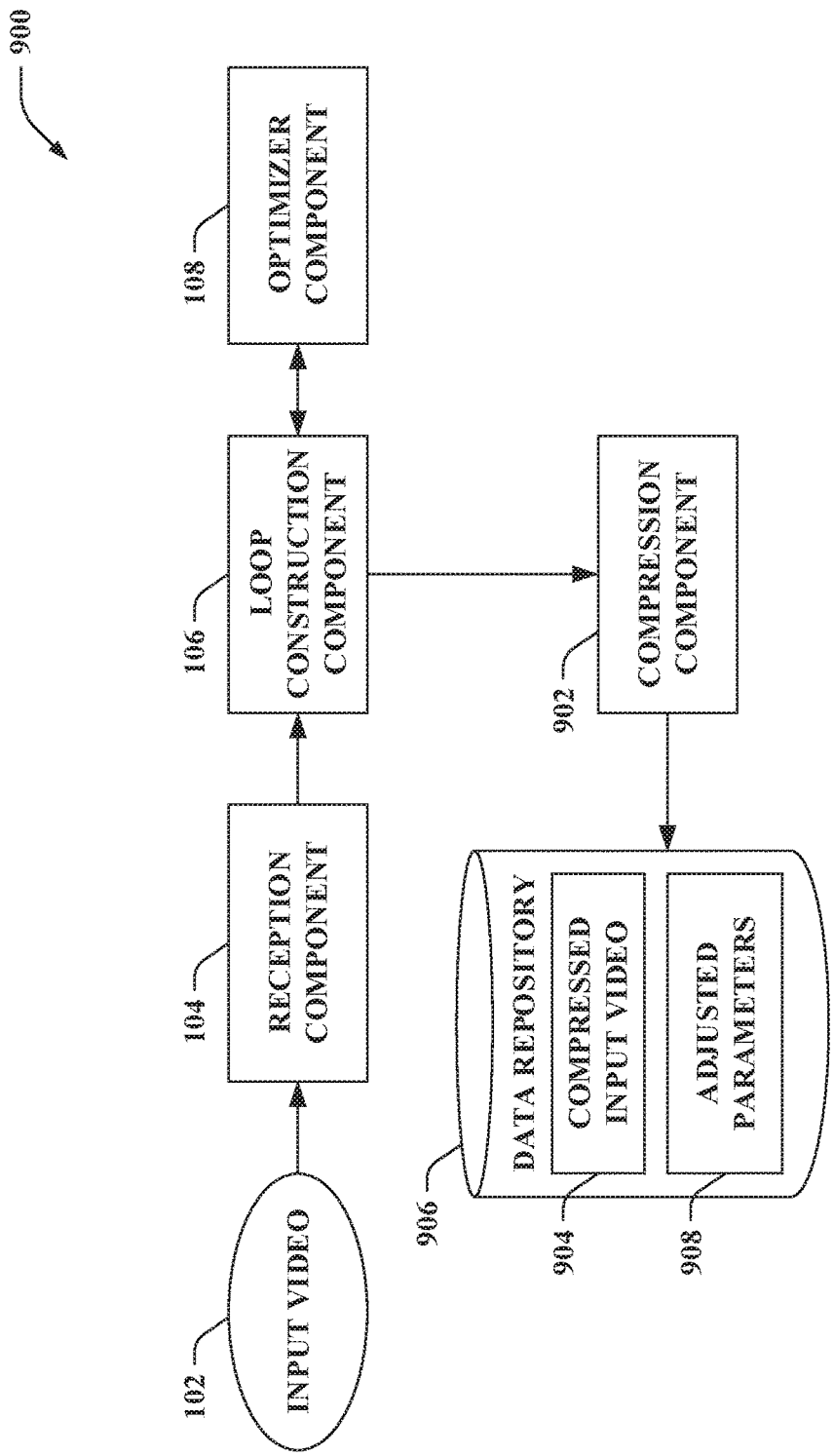
FIG. 9 illustrates a functional block diagram of an exemplary system that compresses an input video.

Turning to FIG. 9, illustrated is a system 900 that compresses the input video 102. The system 900 can include the reception component 104, the loop construction component 106, and the optimizer component 108 as described above. Moreover, although not shown, it is to be appreciated that system 900 can include the viewer component 110.

The system 900 further includes a compression component 902. The compression component 902 can receive the input video 102 and the parameters of a progressive video loop spectrum (e.g., the progressive video loop spectrum 502 of FIG. 5) generated by the loop construction component 106. The compression component 902 can remap the input video 102 based upon the respective input time intervals within the time range of the input video 102 for the pixels to form a compressed input video 904. The compression component 902 can cause the compressed input video 904 to be retained in a data repository 906, for example. Moreover, the compression component 902 can adjust the parameters of the progressive video loop spectrum generated by the loop construction component 106 to create adjusted parameters 908. The adjusted parameters 908 can also be retained in the data repository 906, for example.

The progressive video loop spectrum L can include the four per-pixel parameters $(s'_x, s_x, p_x, a_x)$. These per-pixel parameters can have spatial coherence. For instance, the parameters can be stored in to a four channel Portable Networks Graphics (PNG) image with activation thresholds $a_x$ quantized to eight bits; however, the claimed subject matter is not so limited.

Because the progressive video loop spectrum L accesses only a subset of the input video 102, the compression component 902 can repack contents of the input video 102 into a shorter video $\overline{V}$ of $\max_x p_x$ frames by evaluating the initial frames of the loop $L_1$ having the maximum level of dynamism:

$$\overline{V}(x,t)=V(x,\phi_1(x,t)), 0 \le t < \max_x p_x.$$

Accordingly, the time-mapping function that can be utilized for generating the output video from the compressed input video 904 can be as follows:

$$\overline{\phi}(x,t)=t \bmod p_x$$

By generating the compressed input video 904, it can be unnecessary to store per-pixel loop start times $s_x$, which can have high entropy and thus may not compress well. The static frames can be adjusted by the compression component 902 in the adjusted parameters 908 as $\overline{s}'_x = \overline{\phi}(x, s'_x)$. Moreover, the compression component 902 can reduce entropy of unused portions of the compressed input video 904 by freezing a last pixel value of each loop, which aids in compression.

Figure 10:
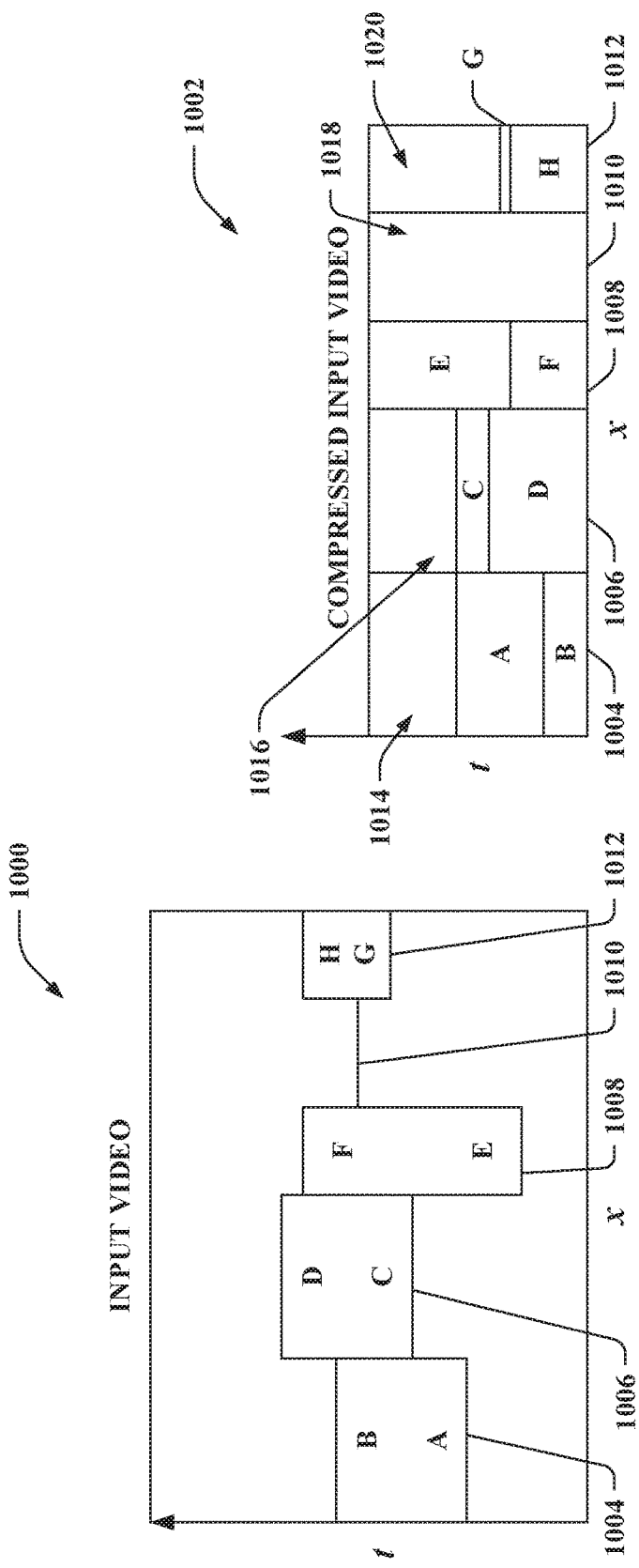
FIG. 10 illustrates an exemplary input video and an exemplary compressed input video.

With reference to FIG. 10, illustrated is an input video 1000 (e.g., the input video 102) and a compressed input video 1002 (e.g., the compressed input video 904). The compressed input video 1002 includes the portion of the input video 1000. For example, the portion of the input video 1000 included in the compressed input video 1002 can be a portion of the input video 1000 accessed by a loop having a maximum level of dynamism (e.g., the loop $L_1$) in a progressive video loop spectrum created for the input video 1000. According to another example, the portion of the input video 1000 included in the compressed input video 1002 can be a portion of the input video 1000 accessed by a single video loop.

Values of pixels in a spatial region 1004 from a corresponding input time interval of the input video 1000 can be remapped to the compressed input video 1002 by evaluating $\overline{V}(x,t)=V(x,\phi_1(x,t))$. Due to the modulo arithmetic in the time mapping function $\phi_1(x,t)$, content of pixels from the input video 1000 often can be temporally rearranged when remapped into the compressed input video 1002. For instance, as depicted in FIG. 10, for pixels in the spatial region 1004, some content A appears temporally prior to other content B in the input video 1000. However, after remapping, the content A is located temporally later than the content B in the compressed input video 1002. While the content A and the content B are rearranged in the compressed input video 10002, it is noted that the content B still follows the content A when the loop content is played (e.g., as it wraps around to form a loop). Similarly, values of pixels in a spatial region 1006, a spatial region 1008, a spatial region 1010, and a spatial region 1012 from respective input time intervals of the input video 1000 can be remapped to the compressed input video 1002.

As illustrated, a per-pixel loop period of the pixels in the spatial region 1008 can be greater than per-pixel loop periods of the spatial region 1004, the spatial region 1006, the spatial region 1010 and the spatial region 1012. Thus, a time range of the compressed input video 1002 can be the per-pixel loop period for the spatial region 1008. Moreover, a last value for pixels in the spatial region 1004, the spatial region 1006, the spatial region 1010 and the spatial region 1012 as remapped in the compressed input video 1002 can be repeated to respectively fill a partial volume 1014, a partial volume 1016, a partial volume 1018, and a partial volume 1020 of the compressed input video 1002.

Various other exemplary aspects generally related to the claimed subject matter are described below. It is to be appreciated, however, that the claimed subject matter is not limited to the following examples.

According to various aspects, in some cases, scene motion or parallax can make it difficult to create high-quality looping videos. For these cases, local alignment of the input video 102 content can be performed to enable enhanced loop creation. Such local alignment can be automatic without user input.

In accordance with an example, local alignment can be performed by treating strong low spatiotemporal frequency edges as structural edges to be aligned directly, whereas a high spatiotemporal frequency areas are treated as textural regions whose flow is smoothly interpolated. The visual result is that aligned structural edges can appear static, leaving the textural regions dynamic and able to be looped. The foregoing can be achieved utilizing a pyramidal optical flow algorithm with smoothing to align each frame of the video to a reference video frame, $t_{ref}$. The reference for the frame can be chosen as the frame that is similar to other frames before local alignment.

To support local alignment, two additional terms can be introduced in the optimization algorithm described herein. The first term can be as follows:

$$E_{aligned}(x) = \begin{cases} \infty & \text{if } p_x = 1 \text{ and } s_x \neq t_{ref} \\ 0 & \text{otherwise} \end{cases}.$$

$E_{aligned}(x)$ can cause static pixels (e.g., not looping) to be taken from the reference frames. The second term can be as follows:

$$E_{flow}(x) = \begin{cases} 0 & \text{if } p_x = 1, \\ \lambda_f \max_{s_x \leq t < s_x + p_x} F(x, t) & \text{otherwise} \end{cases}.$$

$E_{flow}(x)$ can penalize looping pixels in areas of low confidence for optical flow, where $F(x,t)$ is the flow reprojection error (computed at a next-to-finest pyramid level) for a pixel x at time t aligned to the reference frame $t_{ref}$. $F(x,t)$ can be set to infinity for pixels where the reprojection error is larger than the error before warping with the flow field, or where it the warped image is undefined (e.g., due to out-of-bounds flow vectors). According to an example, $\lambda_f = 0.3$ can be used.

The foregoing terms can be employed in the optimization to mitigate loops aligned with poor flow and can cause regions that cannot be aligned to take on values from static reference frame, which can lack alignment error by construction. The looping areas can then be from pixels where the flow error at a course level of the pyramid is low.

In accordance with various aspects, crossfading can be applied to assist masking spatial and temporal discontinuities in a video loop. Crossfading can be utilized to mitigate blurring due to spatial and temporal inconsistencies. For instance, temporal crossfading can be performed during loop creation using a linear blend with an adaptive window size that increases linearly with temporal cost of the loop. Spatial crossfading, for example, can be performed at runtime using a spatial Gaussian filter G at a subset of pixels S. The subset of pixels S can include spatiotemporal pixels with a large spatial cost (e.g., ≥0.003) as well as pixels within an adaptive window size that increases with the spatial cost (e.g., up to a 5×5 neighborhood). For each pixel x∈S, the following can be computed:

$$L(x, t) = \sum_{x'} G(x' - x) V(x, \phi(x', t))$$

Pursuant to various examples, the foregoing computation of L(x,t) can be incorporated into the optimization described herein; yet, the claimed subject matter is not so limited.

Figure 11:
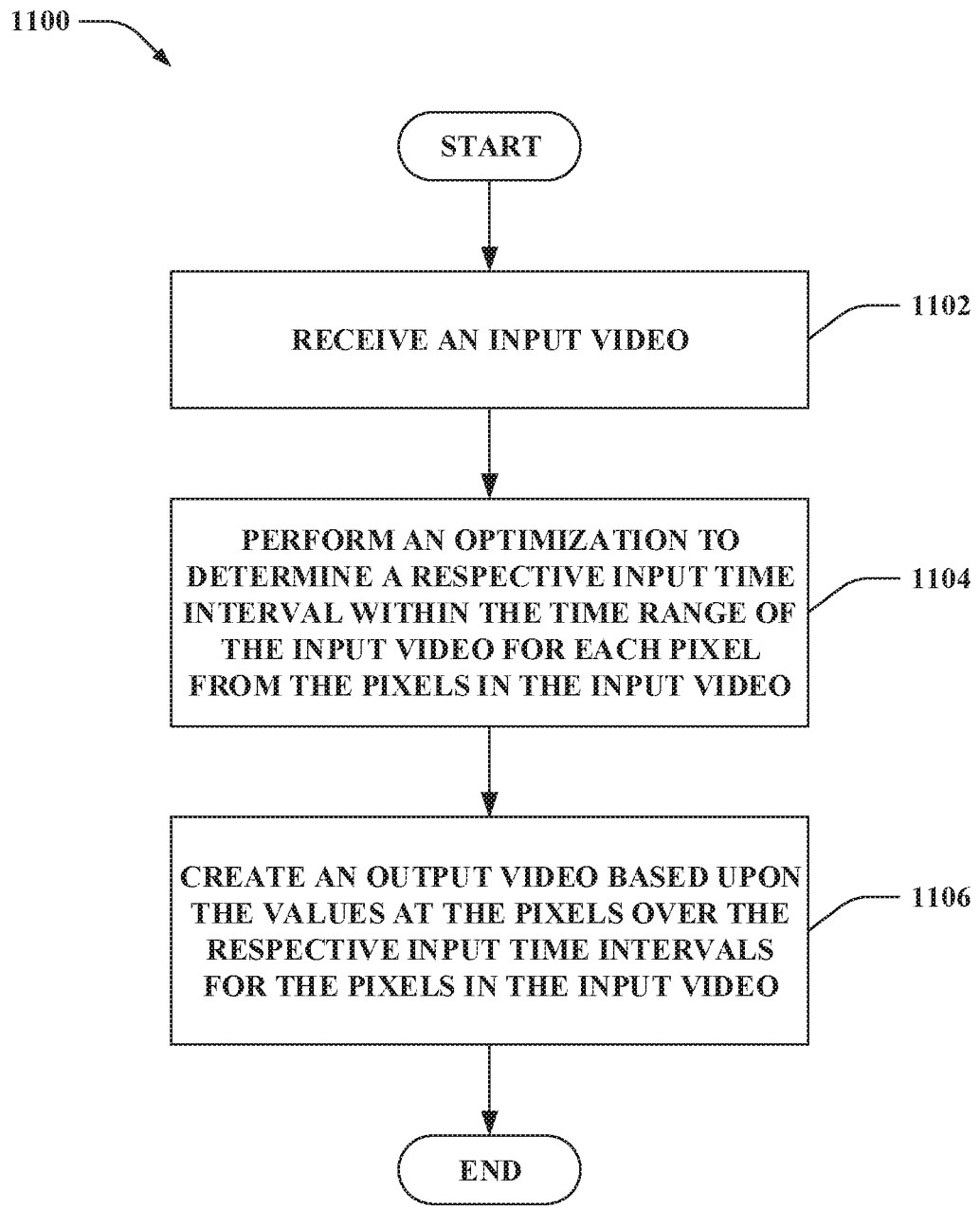
FIG. 11 is a flow diagram that illustrates an exemplary methodology for generating a video loop.
Figure 12:
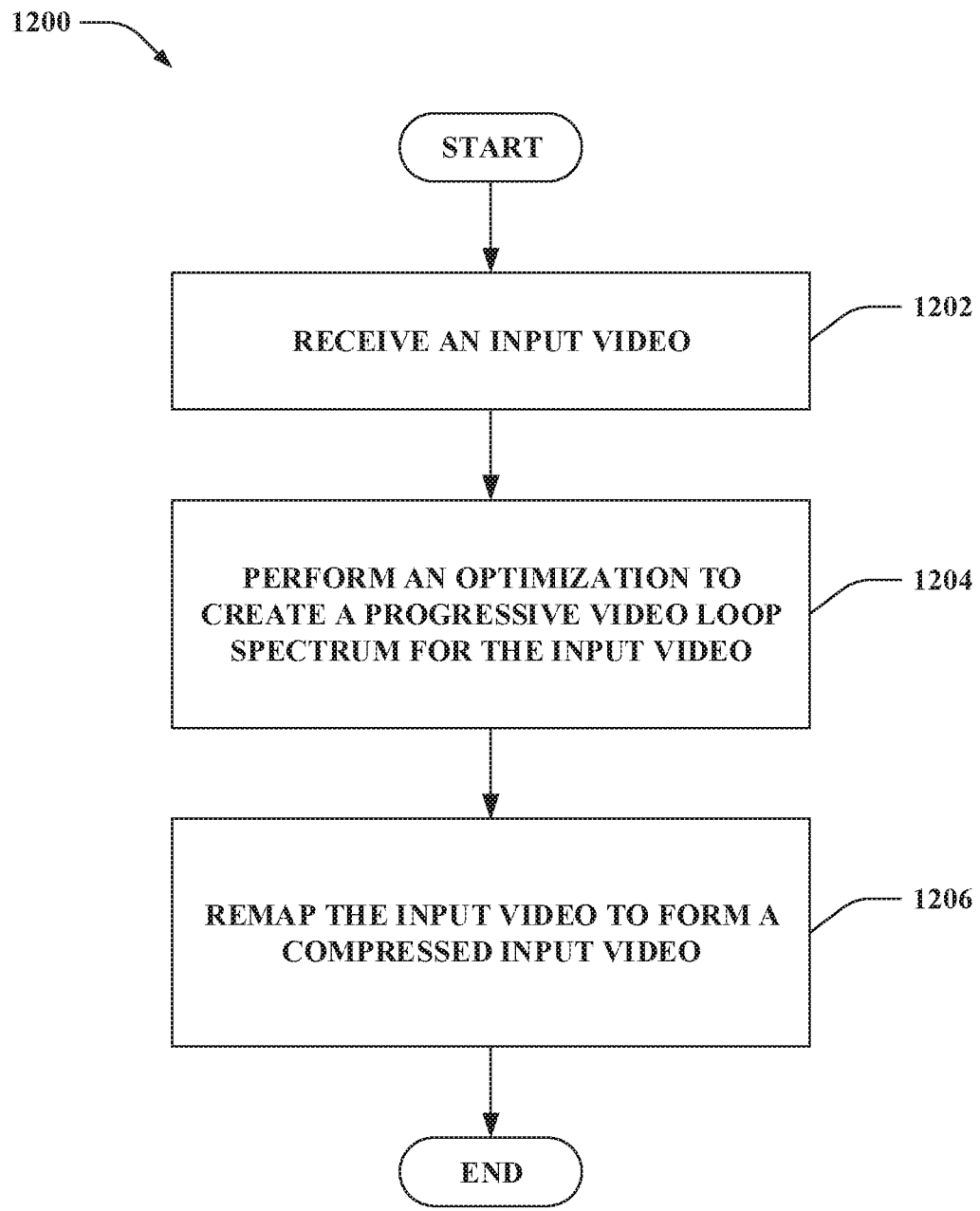
FIG. 12 is a flow diagram that illustrates an exemplary methodology for compressing an input video.
Figure 13:
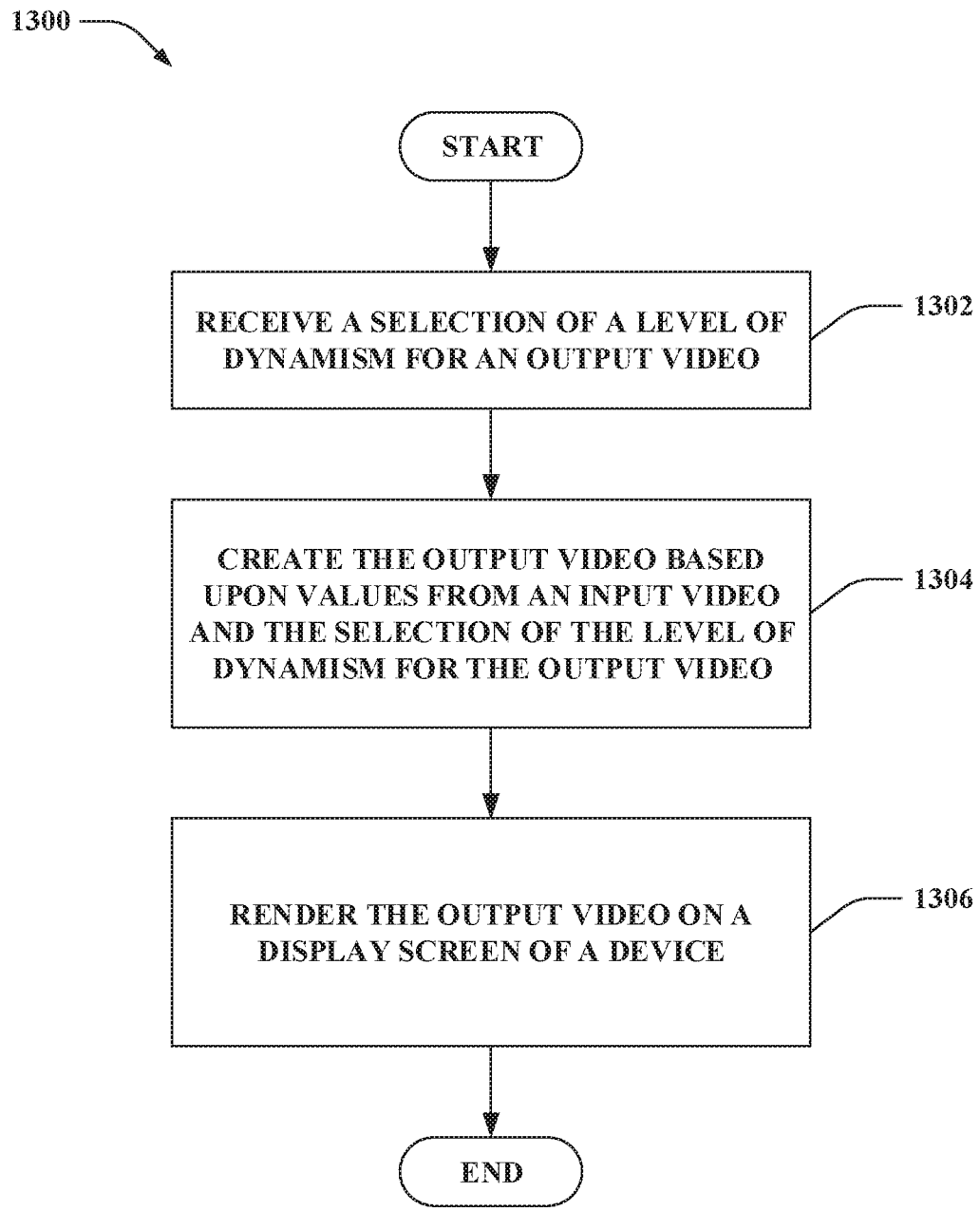
FIG. 13 is a flow diagram that illustrates an exemplary methodology for displaying an output video on a display screen of a device.

FIGS. 11-13 illustrate exemplary methodologies relating to generating looping video. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 11 illustrates a methodology 1100 for generating a video loop. At 1102, an input video can be received. The input video can include values at pixels over a time range. At 1104, an optimization can be performed to determine a respective input time interval within the time range of the input video for each pixel from the pixels in the input video. The respective input time interval for a particular pixel can include a per-pixel loop period and per-pixel start time of the loop at the particular pixel within the time range from the input video. At 1106, an output video can be created based upon the values of the pixels over the respective input time intervals for the pixels in the input video.

Now turning to FIG. 12, illustrated is a methodology 1200 for compressing an input video. At 1202, an input video can be received. The input video can include values at pixels over a time range. At 1204, an optimization can be performed to create a progressive video loop spectrum for the input video. The progressive video loop spectrum can encode a segmentation of the pixels in the input video into independently looping spatial regions. At 1206, the input video can be remapped to form a compressed input video. The compressed input video can include a portion of the input video accessed by a loop having a maximum level of dynamism in the progressive video loop spectrum.

With reference to FIG. 13, illustrated is a methodology 1300 for displaying an output video on a display screen of a device. At 1302, a selection of a level of dynamism for an output video can be received. The level of dynamism can be a normalized measure of temporal variance in a video loop. At 1304, the output video can be created based upon values from an input video and the selection of the level of dynamism for the output video. The level of dynamism in the output video can be controlled based upon the selection by causing spatial regions of the output video to respectively be one of static or looping. At 1306, the output video can be rendered on the display screen of the device. For example, the output video can be created in real-time per frame as needed for rendering. Thus, using a time-mapping function as described herein, values at each pixel can be retrieved from respective input time intervals in the input video (or a compressed input video).

Figure 14:
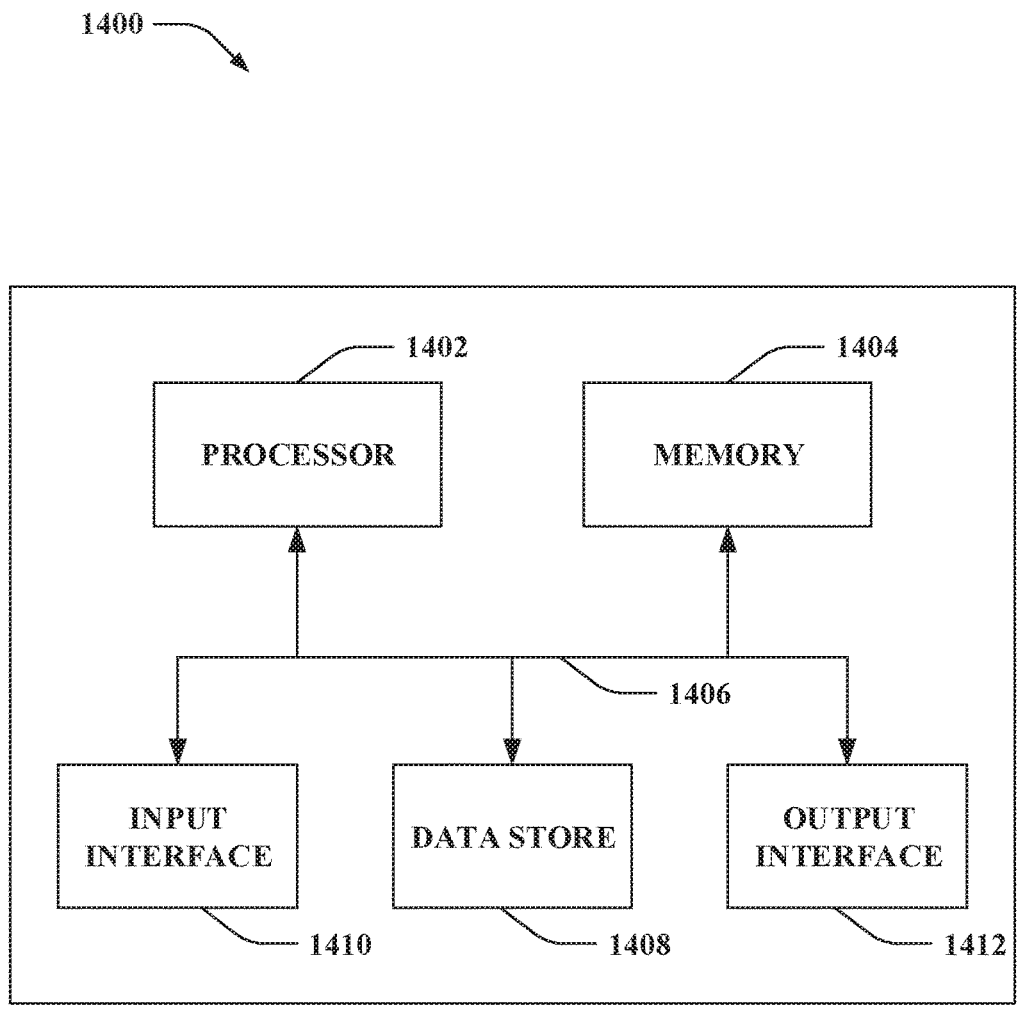
FIG. 14 illustrates an exemplary computing device.

Referring now to FIG. 14, a high-level illustration of an exemplary computing device 1400 that can be used in accordance with the systems and methodologies disclosed herein is illustrated. For instance, the computing device 1400 may be used in a system that forms a video loop or a progressive video loop spectrum from an input video. By way of another example, the computing device 1400 can be used in a system that creates an output video with a controllable level of dynamism. Pursuant to yet a further example, the computing device 1400 can be used in a system that compresses an input video to form a compressed input video. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store an input video, parameters associated with a progressive video loop spectrum, a compressed input video, adjusted parameters, and so forth.

The computing device 1400 additionally includes a data store 1408 that is accessible by the processor 1402 by way of the system bus 1406. The data store 1408 may include executable instructions, an input video, parameters associated with a progressive video loop spectrum, a compressed input video, adjusted parameters, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of rendering an output video, comprising:
generating the output video based on an input video, the output video comprising a static spatial region and a looping spatial region, wherein:
the static spatial region being based on a static time within a time range of the input video, the static time specifying a static frame; and
the looping spatial region being based on an input time interval within the time range of the input video, the input time interval for the looping spatial region comprises a detected loop period of a single, contiguous loop within the time range from the input video; and
causing the output video to be displayed.

2. The method of claim 1, wherein a selection causes the static spatial region to be static.

3. The method of claim 1, wherein a selection causes the looping spatial region to be looping.

4. The method of claim 1, wherein the looping spatial region is a segment of pixels in the input video that independently loops.

5. The method of claim 1, further comprising:
determining the detected loop period for the looping spatial region.

6. The method of claim 1, further comprising:
causing a visual indication that delineates the looping spatial region to be displayed.

7. The method of claim 1, wherein the input time interval for the looping spatial region further comprises a detected start time of the single, contiguous loop within the time range from the input video.

8. The method of claim 1, wherein the output video further comprises a second looping spatial region, the second looping spatial region being based on a second input time interval within the time range of the input video, the second input time interval for the second looping spatial region comprises a second detected loop period of a single, contiguous loop within the time range from the input video.

9. The method of claim 1, further comprising:
receiving the input video; and
subsequent to receiving the input video, stabilizing the input video, wherein the output video is generated based on the input video as stabilized.

10. A system that renders an output video, comprising:
at least one processor; and
memory that comprises computer-executable instructions that, when executed by the at least one processor, cause the at least one processor to perform acts including:
generating the output video based on an input video, the output video comprising a static pixel and a looping pixel, wherein:
the static pixel being based on a static time within a time range of the input video, the static time specifying a static frame; and
the looping pixel being based on an input time interval within the time range of the input video, the input time interval for the looping pixel comprises a detected loop period of a single, contiguous loop at the looping pixel within the time range from the input video; and
causing the output video to be displayed.

11. The system of claim 10, wherein:
a static spatial region of the output video comprises the static pixel, the static spatial region being based on the static time within the time range of the input video; and
a looping spatial region of the output video comprises the looping pixel, the looping spatial region being based on the input time interval within the time range of the input video.

12. The system of claim 11, the memory further comprising computer-executable instructions that, when executed by the at least one processor, cause the at least one processor to perform acts including:
causing a visual indication that delineates the looping spatial region to be displayed.

13. The system of claim 10, the memory further comprising computer-executable instructions that, when executed by the at least one processor, cause the at least one processor to perform acts including:
receiving a selection that causes the static pixel to be static.

14. The system of claim 10, the memory further comprising computer-executable instructions that, when executed by the at least one processor, cause the at least one processor to perform acts including:
receiving a selection that causes the looping pixel to be looping.

15. The system of claim 10, the memory further comprising computer-executable instructions that, when executed by the at least one processor, cause the at least one processor to perform acts including:
determining the detected loop period for the looping pixel.

16. A system that renders an output video, comprising:
at least one processor; and
memory that comprises computer-executable instructions that, when executed by the at least one processor, cause the at least one processor to perform acts including:
generating the output video based on an input video, the output video comprising a static spatial region and a looping spatial region, wherein:
the static spatial region being based on a static time within a time range of the input video, the static time specifying a static frame; and
the looping spatial region being based on an input time interval within the time range of the input video, the input time interval for the looping spatial region comprises a detected loop period of a single, contiguous loop within the time range from the input video; and
causing the output video to be displayed.

17. The system of claim 16, the memory further comprising computer-executable instructions that, when executed by the at least one processor, cause the at least one processor to perform acts including:
receiving a selection that causes the static spatial region to be static.

18. The system of claim 16, the memory further comprising computer-executable instructions that, when executed by the at least one processor, cause the at least one processor to perform acts including:

receiving a selection that causes the looping spatial region to be looping.

19. The system of claim 16, the memory further comprising computer-executable instructions that, when executed by the at least one processor, cause the at least one processor to perform acts including:

determining the detected loop period for the looping spatial region.

20. The system of claim 16, the memory further comprising computer-executable instructions that, when executed by the at least one processor, cause the at least one processor to perform acts including:

causing a visual indication that delineates the looping spatial region to be displayed.

* * * * *